US005280518A

United States Patent [19]

Danler et al.

[11] Patent Number: 5,280,518

[45] Date of Patent: * Jan. 18, 1994

[54] ELECTRONIC SECURITY SYSTEM

[75] Inventors: Richard W. Danler; John W. Sherman, both of Corvallis, Oreg.; David Babler, Vancouver, Wash.; Ron M. Chapin, Gervais, Oreg.; John M. Kniffin, Portland, Oreg.; Kenneth L. Reviea, Salem, Oreg.; Lynn L. Schreiner, Corvallis, Oreg.

[73] Assignee: Supra Products, Inc., Salem, Oreg.

[ * ] Notice: The portion of the term of this patent subsequent to Sep. 3, 2008 has been disclaimed.

[21] Appl. No.: 740,424

[22] Filed: Aug. 5, 1991

Related U.S. Application Data

[60] Continuation-in-part of Ser. No. 640,255, Jan. 11, 1991, abandoned, which is a division of Ser. No. 303,711, Jan. 27, 1989, Pat. No. 4,988,987, which is a continuation-in-part of Ser. No. 192,853, May 11, 1988, abandoned, which is a division of Ser. No. 15,864, Feb. 17, 1987, Pat. No. 4,766,746, which is a continuation-in-part of Ser. No. 831,601, Feb. 21, 1986, Pat. No. 4,727,368, which is a continuation-in-part of Ser. No. 814,364, Dec. 30, 1985, abandoned, which is a continuation of Ser. No. 788,072, Oct. 16, 1985, abandoned, and Ser. No. 640,255, Oct. 16, 1985, which is a continuation-in-part of Ser. No. 433,578, Nov. 8, 1989, Pat. No. 5,046,084, which is a continuation-in-part of Ser. No. 263,174, Oct. 27, 1988, Pat. No. 4,916,443, which is a continuation-in-part of Ser. No. 192,834, May 11, 1988, abandoned, which is a division of Ser. No. 15,864, May 11, 1988.

[51] Int. Cl.[5] .............. H04M 11/00

[52] U.S. Cl. .............. 379/100; 379/103

[58] Field of Search .............. 379/100, 103, 106, 107; 340/825.31

[56] References Cited

U.S. PATENT DOCUMENTS

| | | | |
|---|---|---|---|
| 4,594,637 | 6/1986 | Falk | 361/172 |
| 4,609,780 | 9/1986 | Clark | 379/103 |
| 4,727,368 | 2/1988 | Larson et al. | 340/825.31 |
| 4,766,746 | 8/1988 | Henderson et al. | 70/63 |
| 4,777,556 | 10/1988 | Imran | 361/155 |
| 4,800,255 | 1/1989 | Imran | 235/382 |
| 4,808,993 | 2/1989 | Clark | 340/825.31 |
| 4,851,652 | 7/1989 | Imran | 235/382 |
| 4,864,115 | 9/1989 | Imran et al. | 235/492 |
| 4,887,292 | 12/1989 | Barrett et al. | 379/103 |
| 4,896,246 | 1/1990 | Henderson et al. | 361/171 |
| 4,914,732 | 4/1990 | Henderson et al. | 340/825.17 |
| 4,916,443 | 4/1990 | Barrett et al. | 340/825.31 |
| 4,929,880 | 5/1990 | Henderson et al. | 320/30 |
| 4,947,163 | 8/1990 | Henderson et al. | 340/825.31 |
| 4,988,987 | 1/1991 | Barrett et al. | 340/825.31 |
| 5,046,084 | 9/1991 | Barrett et al. | 379/100 |

FOREIGN PATENT DOCUMENTS

| | | |
|---|---|---|
| WO91/18169 | 5/1991 | PCT Int'l Appl. . |
| WO91/20026 | 6/1991 | PCT Int'l Appl. . |

*Primary Examiner*—James L. Dwyer
*Assistant Examiner*—Ahmad F. Matar
*Attorney, Agent, or Firm*—Klarquist, Sparkman, Campbell, Leigh & Whinston

[57] ABSTRACT

An electronic real estate lockbox system includes a number of operational features, including facsimile reporting capability, bilateral locking solenoids, improved shackle latching capabilities, improved key-compartment release operation, two-wire bilateral lock-key communications, improved case design, viral lockout list propagation, an update code grace period, packet formatted data transmission with error recovery, FSK audio data downloading, and high security challenge-response authorization procedures. A variety of other operational features are also disclosed.

15 Claims, 17 Drawing Sheets

LOCKBOX MEMORY

KEY MEMORY

ELECTRONIC SECURITY SYSTEM

The present application is a continuation in part of application Ser. No. 07/640,255, filed Jan. 11, 1991 (now abandoned), which was a division of Ser. No. 07/303,711, filed Jan. 27, 1989, now U.S. Pat. No. 4,988,987, which is a continuation in part of Ser. No. 07/192,853, filed May 11, 1988, now abandoned, which is a division of Ser. No. 07/015,864, filed Feb. 17, 1987, now U.S. Pat. No. 4,766,746, which is a continuation in part of Ser. No. 06/831,601, filed Feb. 21, 1986, now U.S. Pat. No. 4,727,368, which is a continuation in part of Ser. No. 06/814,364, filed Dec. 30, 1985, now abandoned, which is a continuation in part of Ser. No. 06/788,072, filed Oct. 16, 1985, now abandoned. These applications are incorporated herein by reference. The present application is also a continuation in part of application Ser. No. 07/433,578, filed Nov. 8, 1989, and now U.S. Pat. No. 5,046,084, which was a continuation in part of Ser. No. 07/263,174, filed Oct. 27, 1988, now U.S. Pat. No. 4,916,443, which was a continuation in part of Ser. No. 07/192,834, filed May 11, 1988, now abandoned, which was a division of Ser. No. 07/015,864, which is referenced above.

FIELD OF THE INVENTION

The present invention relates to electronic security devices and is illustrated particularly with reference to an electronic real estate lock box system.

BACKGROUND AND SUMMARY OF THE INVENTION

Electronic real estate lock boxes are well known in the art, as shown by U.S. Pat. Nos. 4,609,780, 4,727,368, 4,777,556, 4,800,255, 4,851,652, 4,864,115, 4,916,443, and allowed application Ser. No. 07/433,578, all of which are assigned to the present assignee and incorporated herein by reference.

The prior art is also represented by the Advantage Express lock box system, which is marketed by the present assignee. Publications relating to this system are submitted herewith to ensure their public availability and are incorporated herein by reference. The following disclosure details how the lock box systems described in the foregoing prior art, and security systems generally, may be even further improved. These improvements relate to refinements to the systems' component parts, enhancements to the lock devices' physical security, and improvements of a general nature.

These improvements will be more readily apparent from the following detailed description, which proceeds with reference to the accompanying drawings.

DETAILED DESCRIPTION

Figure 1:
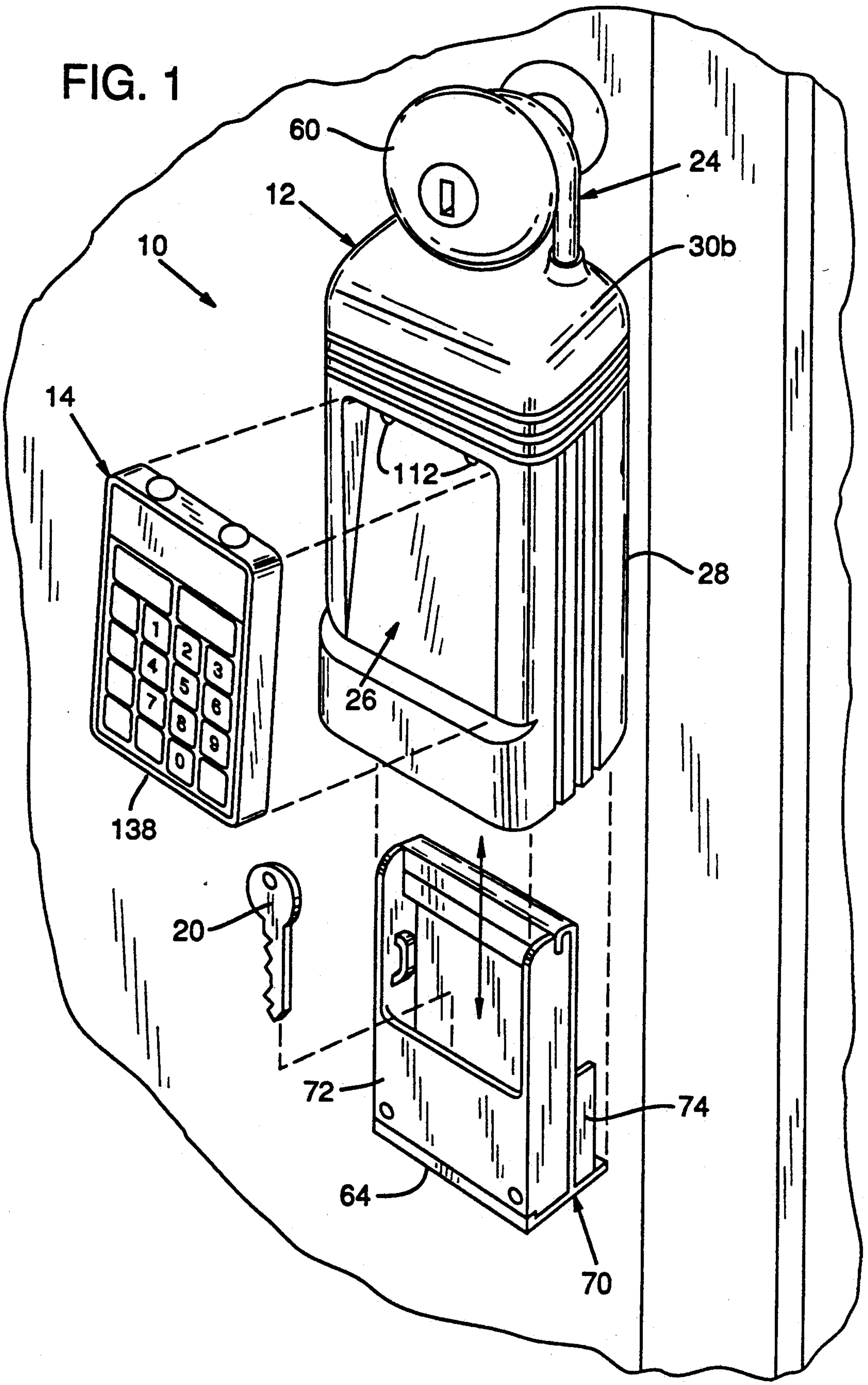
FIG. 1 is a view of a lock box according to the present invention hung from the doorknob of a door, together with an associated electronic key, door key, and door key container.

A basic lock box system 10 according to the illustrated embodiment of the present invention includes one or more lock boxes or keysafes 12, electronic keys 14, programming bases 16 and computers 18. Lock box 12 contains the door key to the dwelling and is mounted securely on or near the dwelling. Electronic key 14 is used by real estate agents to open the lock box and gain access to a dwelling key 20 contained therein. Electronic key 14 can also be used to read access log data from the lock box and to set certain variables within the lock box. Programming bases 16 are used to load data to, and retrieve data from, the lock boxes and electronic keys. Computer 18 serves as a central station at which data from a plurality of programming bases can be assembled. The computer can also serve to program the programming bases 16. In the illustrated embodiment, the central computer is located at the office of the Multiple Listing Service (MLS) that oversees operation of the lock box system.

Lock Box Mechanical Description

Referring now to FIGS. 1–3 and 6, the illustrated lock box includes a housing 22, a shackle 24 and a nest 26 into which the electronic key 14 may be lodged. The housing includes a resilient elastomeric material 28 to reduce impact damage that may be caused by the lock box on a door. Immediately beneath the elastomeric covering is a secure extruded aluminum housing having a lower portion 30*a* and a top piece 30*b*.

Figure 6:
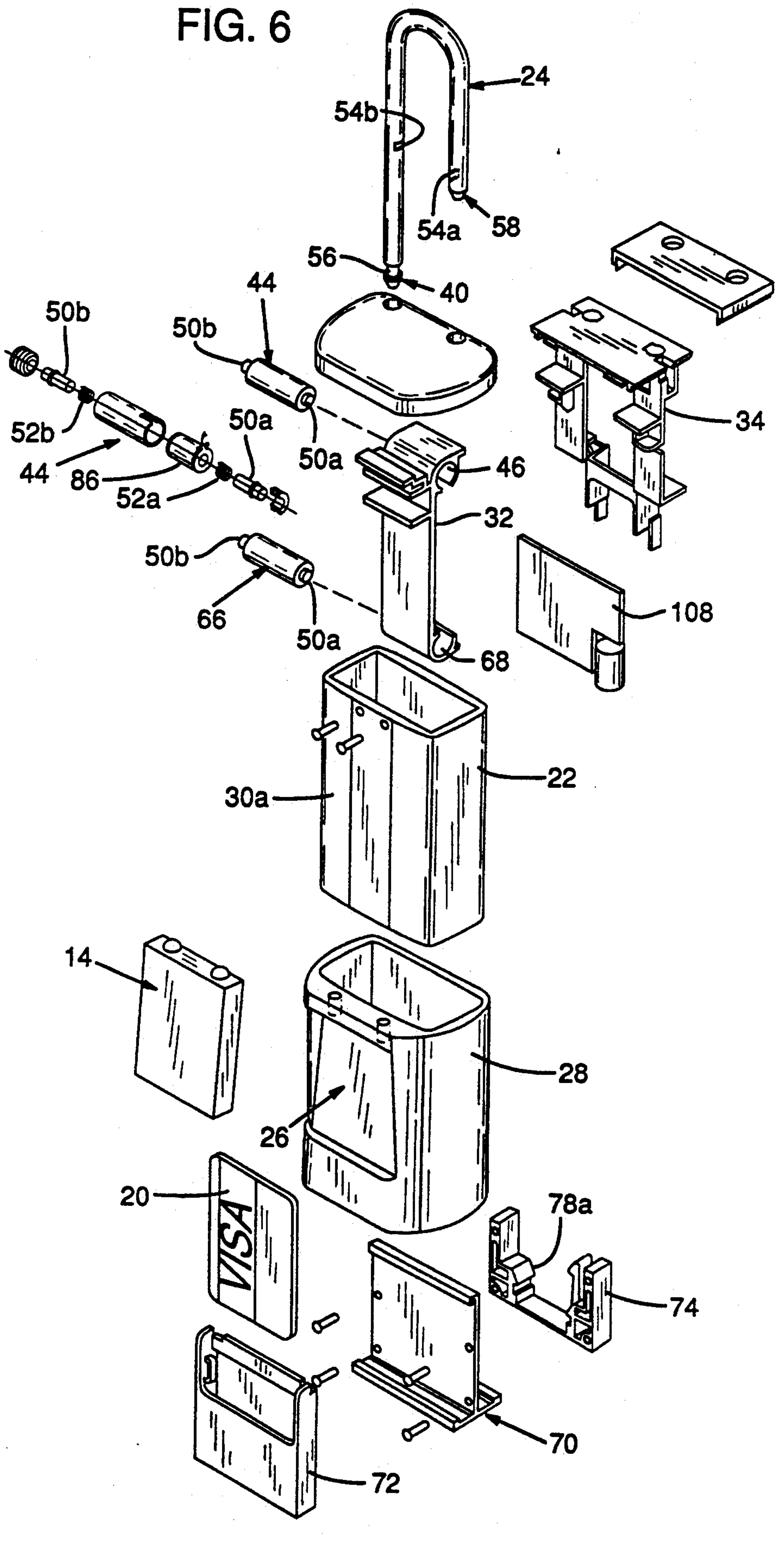
FIG. 6 is an exploded view showing the lock box and electronic key of FIG. 1.

As can best be seen in FIG. 6, the lower portion 30*a* has a generally rectangular horizontal cross section with four corners and four walls extending therebetween. The thickness of each wall generally increases with the distance from the most nearly adjoining corner. Thus, the thickness of the walls is greater at their midportion than at their ends. By this arrangement, the bending moment that must be applied to the case to pry apart the walls is made less dependent on the particular location to which the bending moment is applied.

Inside the secure metal housing 30, the lock box components generally mount on, or are fastened to, first and second frame members 32, 34. The first frame member 32 is an aluminum extrusion. The second frame member 34 is formed of injection molded plastic and includes a multi-tier bushing 34*a* for shackle 24.

Returning now to FIG. 2, it can be seen that the shackle 24 has a longer leg 36 and a shorter leg 38. The distal end 40 of the longer leg 36 is engaged by a spring 42 that biases the shackle out of the case 30.

Figure 8:
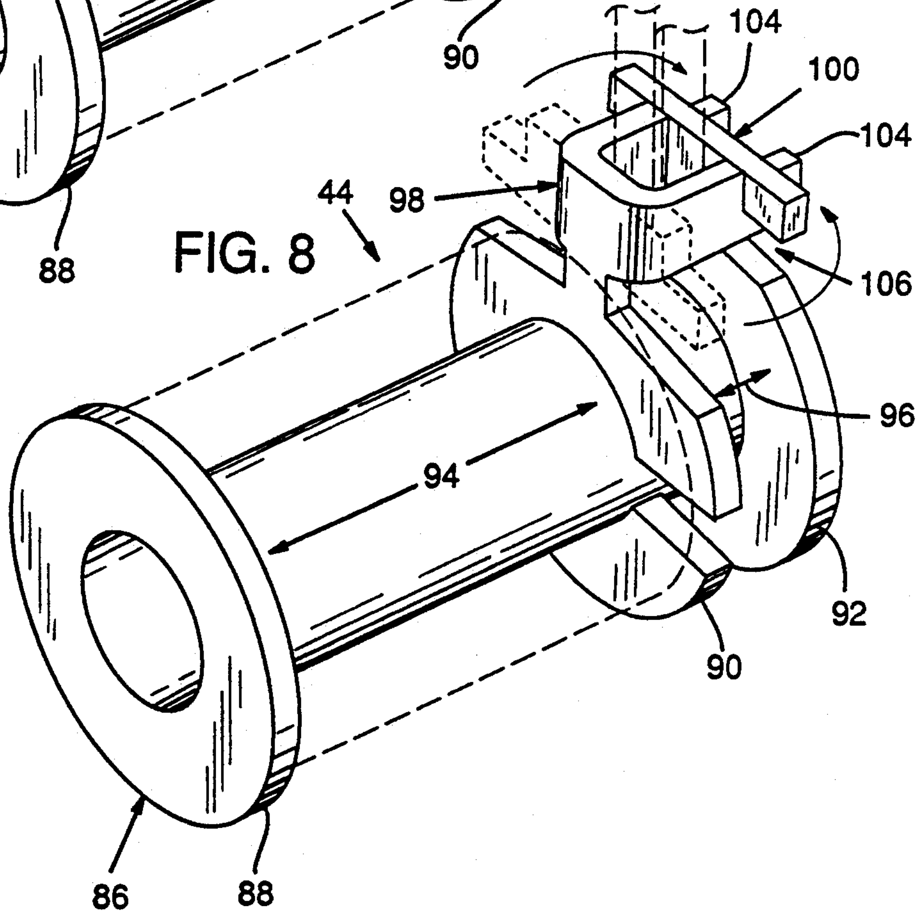
FIG. 8 is a view of the bobbin of FIG. 7 in a second state in which the solenoid wires (shown in phantom) are channeled by certain of the bobbin members.

The shackle is retained in its locked position by a shackle solenoid 44 that is held in a cylindrical recess 46 in the first frame member 32. This solenoid comprises an electromagnetic winding 48 (FIG. 8) and a pair of plungers 50*a*, 50*b*. These plungers are biased out of the solenoid by springs 52*a*, 52*b* (FIG. 6) therein.

Figure 2:
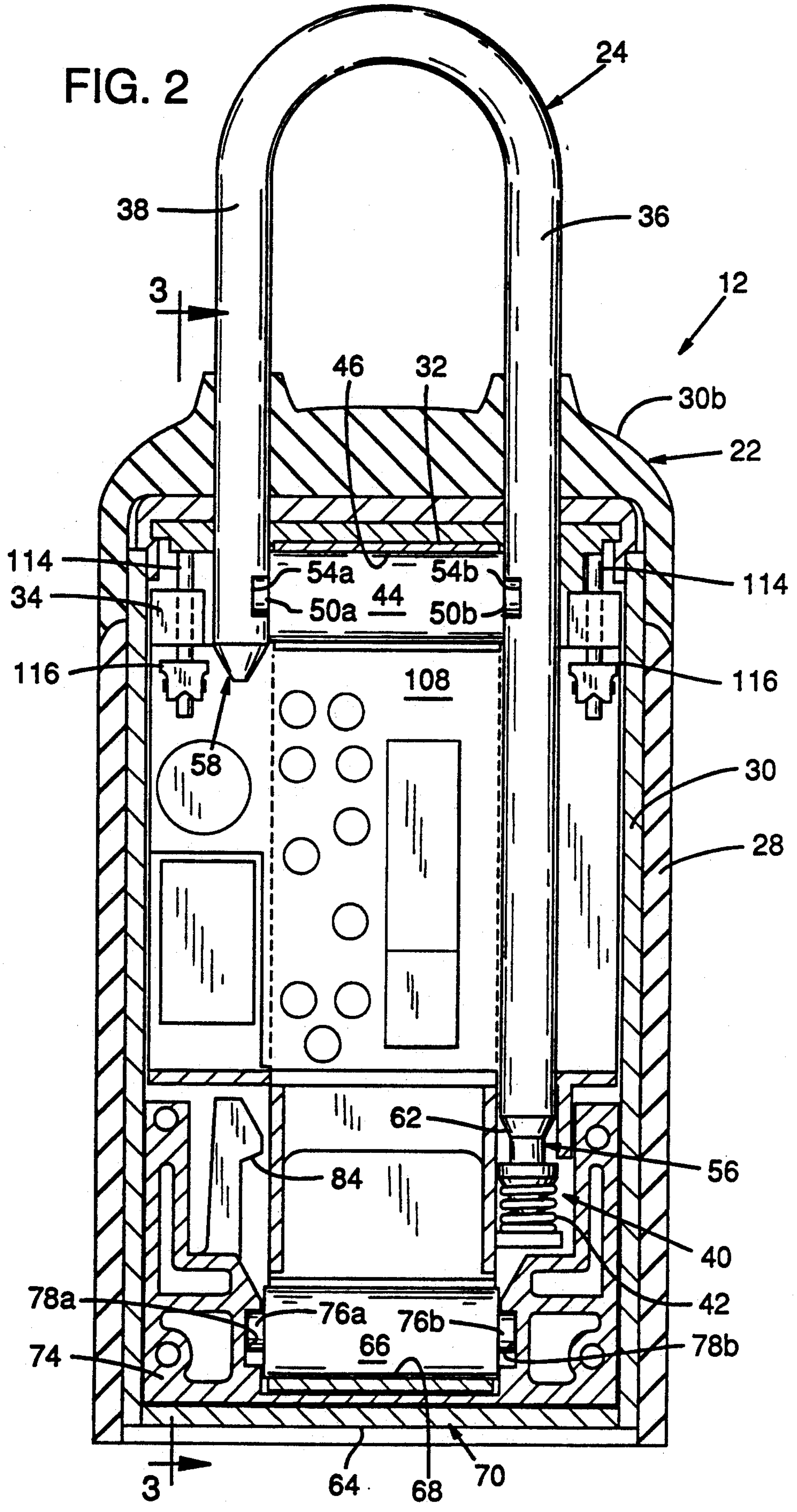
FIG. 2 is a section view of the lock box of FIG. 1.
Figure 3:
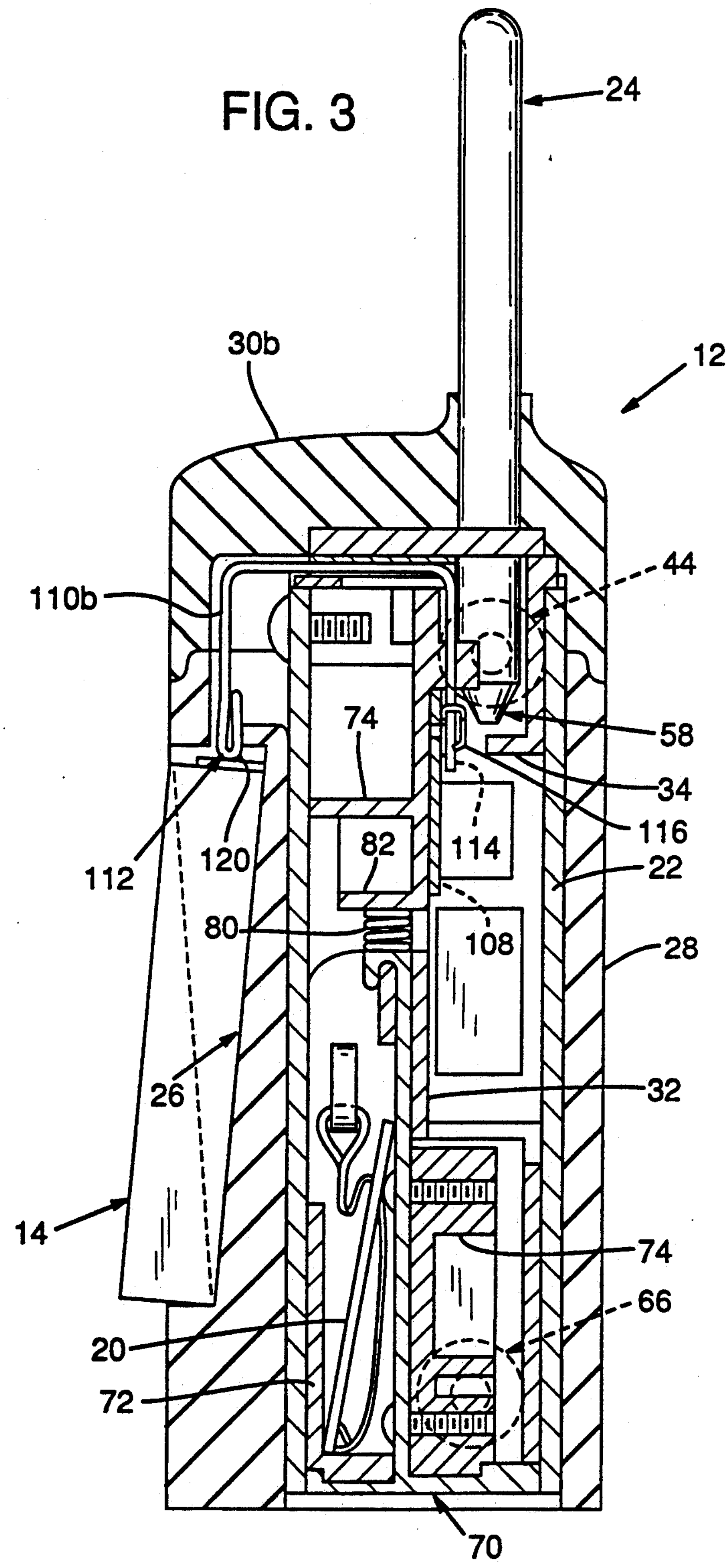
FIG. 3 is a section view taken on lines 3—3 of FIG. 2.

When the electromagnetic winding 48 is in a de-energized state, the plungers 50 are spring biased toward extended positions shown in FIG. 2. When the electromagnetic winding is energized, the plungers are magnetically retracted into the body of the solenoid. It can thus be seen that the two plungers retract and extend in tandem depending on the state of the electromagnetic winding 48.

It will be noted that, unlike conventional solenoids, the illustrated solenoid 44 does not have an fixed armature to which a plunger is electromagnetically attracted. Rather, each plunger acts as an armature to the other plunger.

The two plungers 50 of solenoid 44 engage engagements features 54*a*, 54*b* in legs 36, 38 of the shackle. In the illustrated embodiment, these engagement features take the form of notches cut into the shackle. Near the distal end of the longer leg 36 is another engagement feature 56.

In operation, the shackle solenoid 44 is energized momentarily to remove the plungers 50 from the engagement features 54. Spring 42 is then able to push the shackle upwardly a small distance. When the solenoid is thereafter de-energized, the plungers are no longer in operative alignment with the notches 54. Instead, the plungers are forced to stay in their retracted state by the presence of the un-notched portion of the shackle immediately adjacent the solenoid. In this condition, the shackle can be partially withdrawn from the case, with the plunger 50*b* sliding against shackle leg 36 until the lower engagement feature 56 is reached. At this point, the spring 52*b* inside solenoid 44 acts to extend the plunger 50*b* into the lower engagement feature 56, again preventing further retraction of the shackle.

In this partially-removed state, the distal end 58 of the shorter shackle leg 38 is outside the case. The shackle can thus be rotated about the longer leg 36, permitting the associated lock box to be freed from the doorknob 60.

If it is desired to remove the shackle entirely from the case, the shackle solenoid 44 is energized a second time. When plunger 50*b* retracts out of engagement with notch 56, the shackle can be pulled free of the lock box.

It will be recognized that the foregoing arrangement advantageously affords a dual use of a single latching mechanism. This latching mechanism sequentially engages two different notches in a single leg of the shackle, thereby either locking the shackle in one of two different positions with respect to the lock box, or freeing the shackle completely of the lock box.

It will be noted that the lower notch 56 is beveled on its upper side 62 to permit the shackle to be urged into the lock box from its partially retracted position without again energizing the shackle solenoid.

It will be further recognized that the notch 54*a* in the short shackle leg 38 may be omitted in alternative embodiments while still affording the above-described feature whereby the shackle can be locked in one of two positions, or freed entirely from the lock box by use of a single latching mechanism. However, the illustrated embodiment in which both the longer and shorter legs are physically engaged at notches 54 by the solenoid 44 has been found to provide a more secure construction.

In an alternative embodiment, the lower engagement feature is modified from the illustrated notch form. Instead of a notch, a groove is provided that circumferentially extends about the leg from the side of the leg closest to the shackle to a remote side that is provided with a flat surface. This flat surface extends to the distal end 40 of the longer leg 36.

In this alternative embodiment, the upper notch 54*b* is engaged as before. The solenoid is momentarily operated to retract its plungers from this upper notch to thereby free the shackle for partial withdrawal from the case. After the shackle is withdrawn a distance, the plunger 50*b* extends into the above-described groove. This locks the shackle in a second position in which the distal end 58 of the shorter leg 38 is disposed outside of the case. In this position, the shackle can be rotated so that the plunger travels along the circumferential groove to the flat side of the shackle leg. Once the plunger abuts this flat side of the shackle leg, the shackle can be fully withdrawn from the case, since there is no shoulder against which the plunger can catch.

A solenoid arrangement similar to that described above is used to lock and release the key container 64 from the lower portion of the illustrated lock box 12. Like the shackle locking solenoid 44, a container locking solenoid 66 is held in a cylindrical recess 68 in the first frame member 32.

As best shown in FIG. 6, the illustrated key container 64 includes an extrusion member 70 having a key pouch 72 fastened to a front side thereof, and a molded member 74 fastened to a rear side thereof. A container locking solenoid 66, identical in construction to shackle solenoid 44, operates to controllably release the key container 64 from the housing 22.

As best shown in FIG. 2, the first and second plungers 76*a*, 76*b* of the compartment solenoid 66 engage notches 78*a*, 78*b* formed in the molded member 74, thereby maintaining the key container within the housing 22.

If the key compartment solenoid 66 is momentarily energized, the plungers 76 retract from the notches 78. In this instant, a pair of springs 80 (FIG. 3) that are normally in compression between the top of the key pouch 72 and ledges 82 on the molded member 74, expand, pushing the key compartment downwardly. When the compartment solenoid 66 is thereafter de-energized, the notches 78 are no longer in position to receive plunger 76. They key container is thus free to drop downwardly a distance out of the case.

The key container is prevented from falling completely out of the case 22 by an engagement surface 84 that is formed on the molded member 74, and against which the extended plunger 76*a* from de-energized solenoid 66 impinges. The engagement surface 84 is angled to permit the key container to be manually pulled down and free of the lock box case. The angled engagement surface urges the plunger back into the solenoid during this process. After the engagement surface 84 has been pulled completely past the solenoid plunger, the key container can be freely removed from the bottom of the case 22.

The use of double-plunger solenoids to secure the shackle and the key container affords an important improvement in impact and pick-resistance. For example, any impact to the lock box case that tends to urge one of the plungers out of engagement with the corresponding notch will tend to urge the other of the plungers into engagement with its notch.

Figure 7:
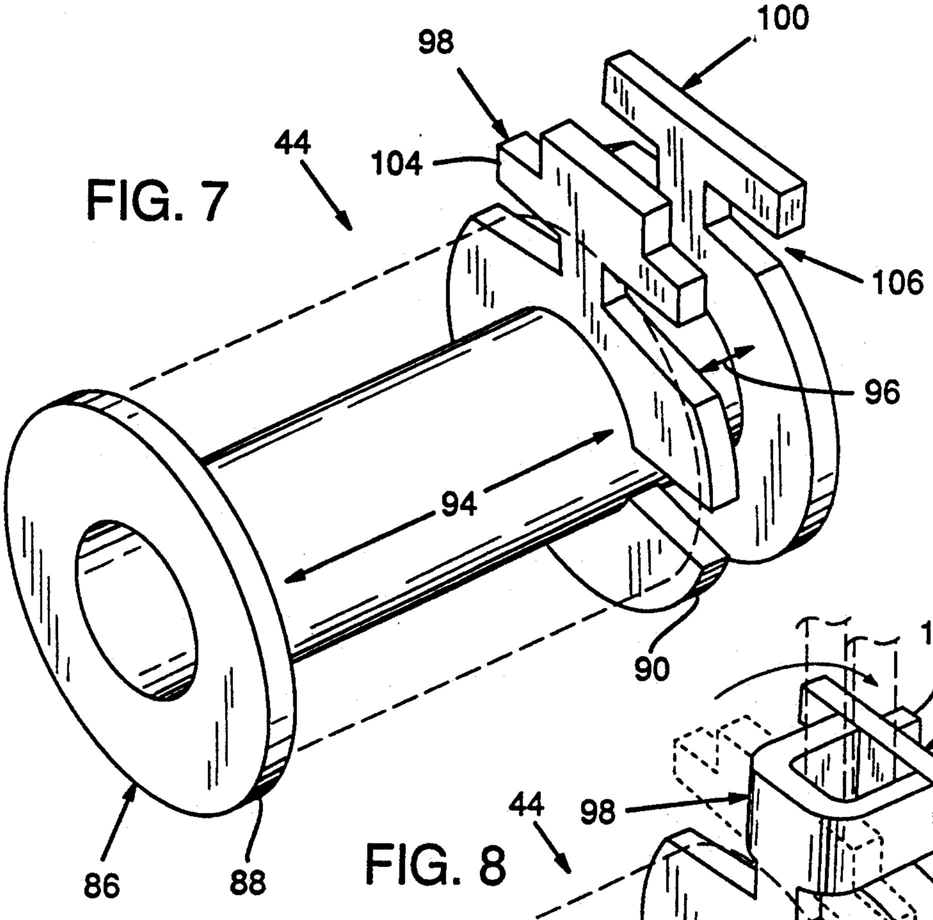
FIG. 7 is an illustration of a solenoid bobbin employed in the lock box of FIG. 1.

Solenoids 44 and 66 both employ a novel bobbin structure that permits the same wire used for the solenoid winding to extend from the bobbin and serve as the solenoid power terminals. In this construction, a plastic bobbin 86 (FIGS. 7, 8) includes first, second and third plastic members 88, 90, 92 extending circumferentially and radially therefrom. The first and second members 88, 90 define an area 94 in which the 30-gauge enameled magnet wire used for the solenoid winding (e.g. winding 48) is to be confined. The second and third members 90, 92 define a smaller area 96 in which a few additional turns of the solenoid winding may be placed.

The second and third members 90, 92 of the bobbin assembly include features 98, 100 that cooperate to define an insulated passageway 102 that has an axis oriented generally radially of the bobbin and through which the ends of the magnet wire can extend. Feature 98 can be bent so that fingers 104 thereof engage corresponding slots 106 in feature 100 on the third member 92.

Figure 4:
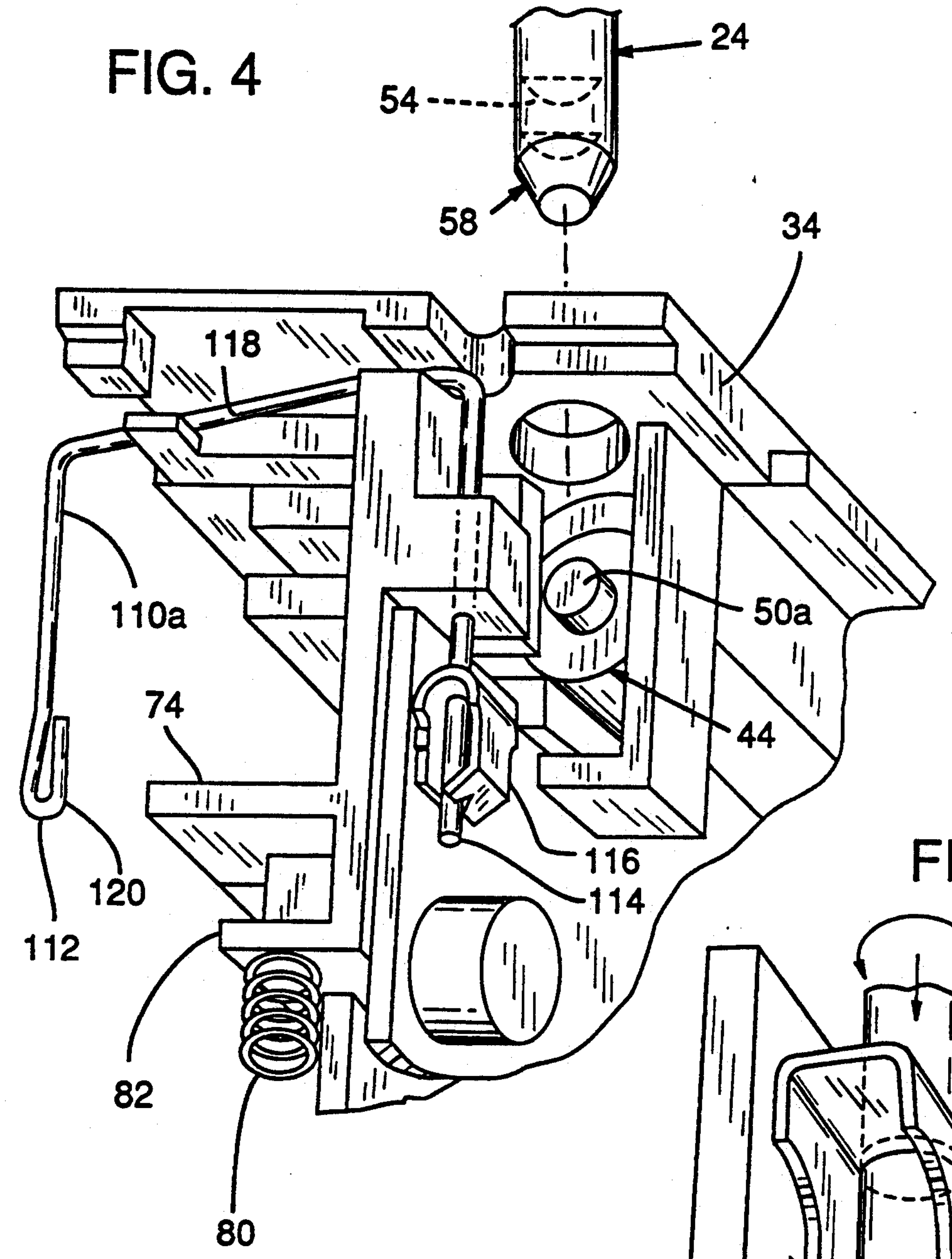
FIG. 4 is a detail showing certain elements of the lock box of FIG. 1.
Figure 5:
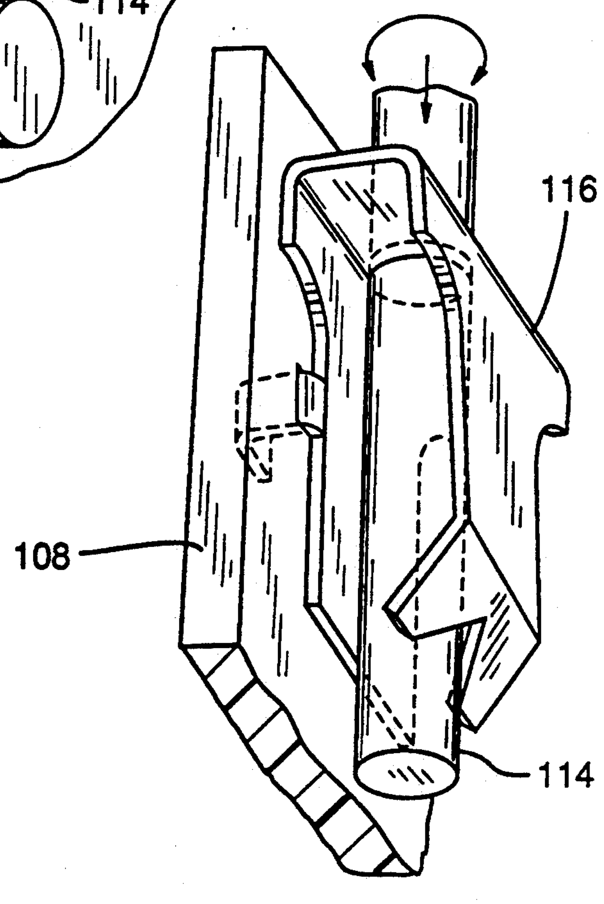
FIG. 5 is a detail of a wiping jack used on a circuit board in the lock box of FIG. 1.

Disposed within the lock box 12 is a printed circuit board 108 on which various electronic components are mounted. It is necessary to electrically couple this printed circuit board to the outside of the housing 22. It is also necessary to provide electrical contact members to effect the connection to the electronic key. In the illustrated embodiment, a pair of unitary spring metal members 110*a*, 110*b* are used for both the coupling and contacting elements. Each such member has a first distal end 112 external to the case and a second distal end 114 internal to the case. The printed circuit board is provided with a pair of wiping jacks 116 (FIG. 5) adapted to receive the second distal ends of the metal members 110. The midsection 118 of each member is routed along a path (FIG. 4) that mechanically biases the member against its own spring force. The first distal end 112 is formed in a loop 120 to provide a blunt connecting element.

The cooperation of the spring nature of the elements 110, together with their spring biasing along their midsections, serve to mechanically isolate movement imparted by the electronic key to the external distal ends 112 from the circuit board jacks 116, while also providing a resilient contact against which the electronic key 14 can be urged.

In the preferred embodiment, the printed circuit board 110, together with the wiping jacks 116, are coated with a conformal coating. In assembly of the illustrated lock box, the internal distal ends 114 of the spring members 110 are inserted into the wiping jacks, thereby displacing the conformal coating therefrom.

As was earlier noted, the lock box housing includes an elastomeric covering 28. The routing of the spring metal elements 110 through this elastomeric coating helps resiliently retain the external ends 112 thereof in desired positions and enhances the spring-contact action provided by their spring nature.

Lock Box Electrical Details

Figure 9:
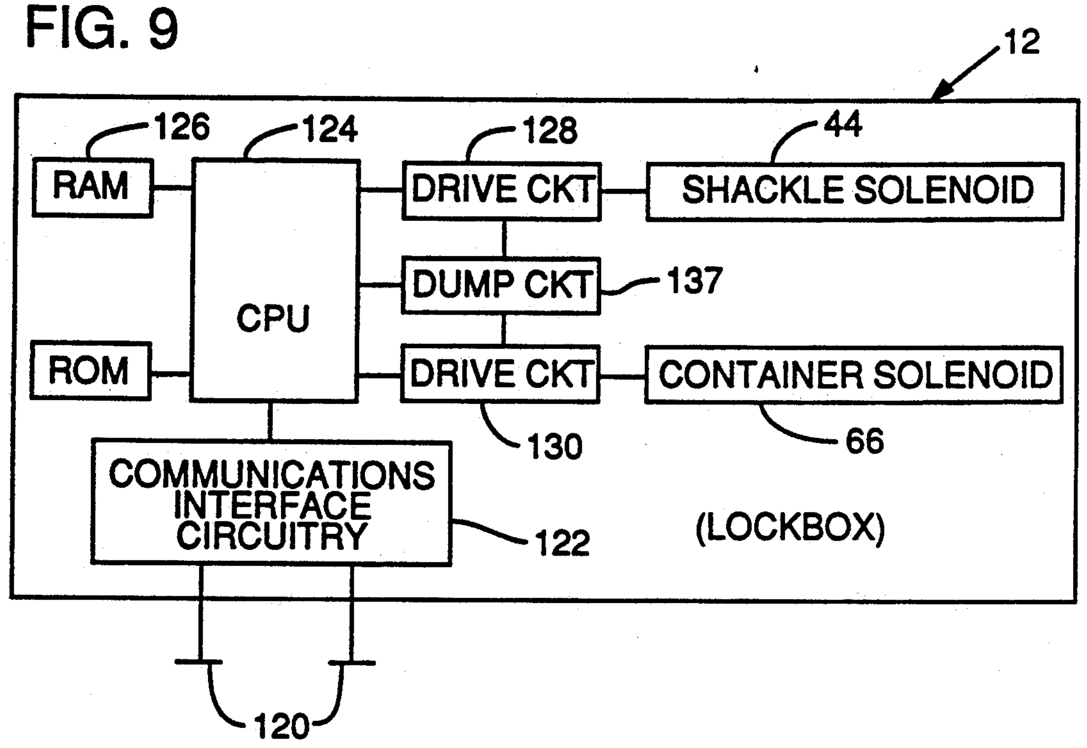
FIG. 9 is a block diagram of circuitry used in the lock box of FIG. 1.
Figure 9A:
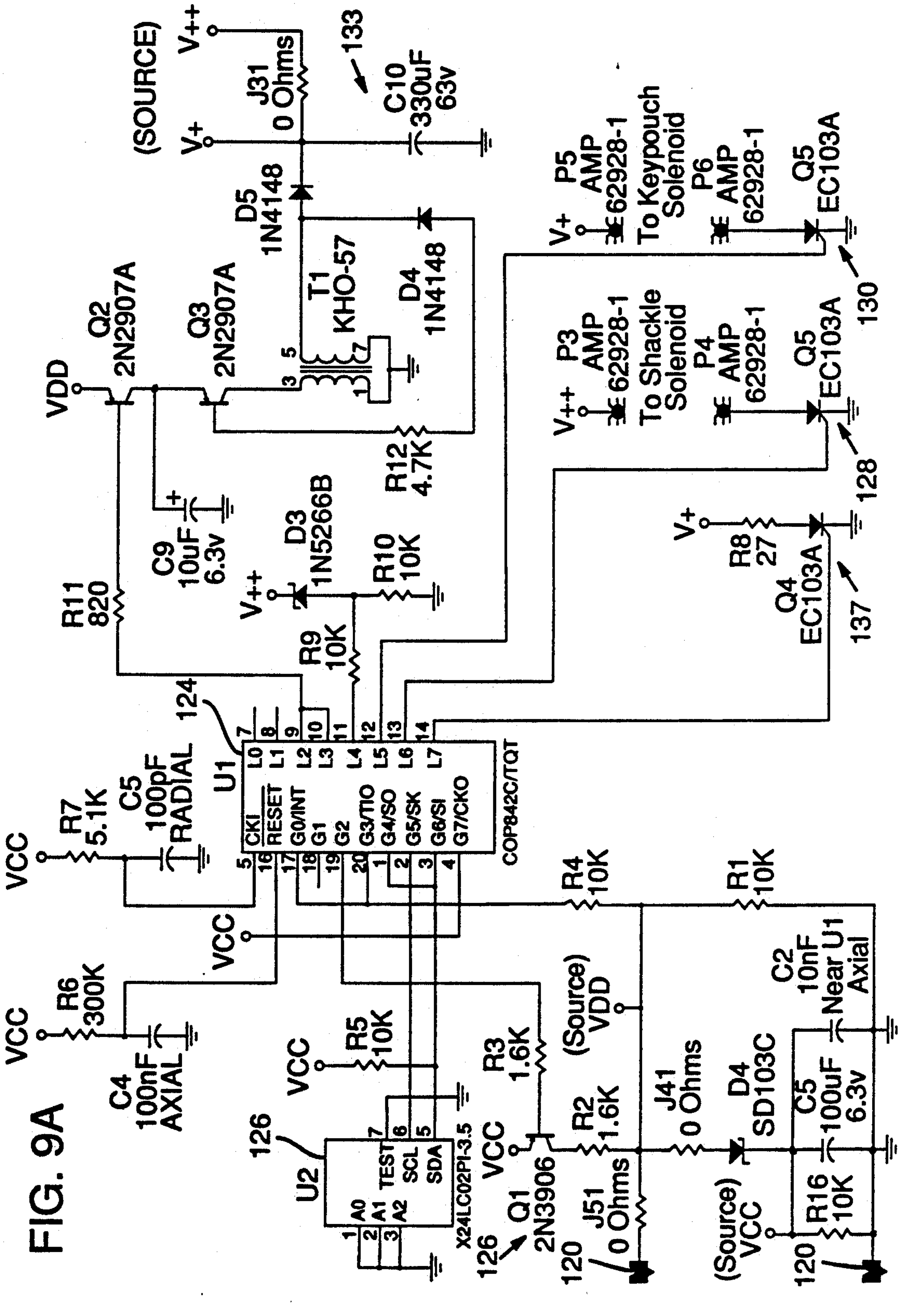
FIG. 9A is a schematic diagram of the lock box of FIG. 1.

The circuitry of lock box 12 is shown in block diagram form in FIG. 9 and in schematic form in FIG. 9A. Lock box 12 includes electronic key connecting elements 120, a communications interface 122, a microprocessor (CPU) 24, a non-volatile read/write RAM (EEPROM) memory 126, the shackle locking solenoid 44, the key compartment locking solenoid 66, associated drive circuits 128, 130, and a dump circuit 137.

The electronic key connecting elements 120 are used to contact corresponding elements on the top of the electronic key 14 and associated with the base 16. The interface 122 bidirectionally exchanges data signals between the lockbox and the unit to which it is coupled over a power signal that is provided to the lock box over the same connecting elements 120. The lock box microprocessor 124 controls operation of the lock box according to programming instructions ("lock box control software") permanently stored in an internal 8K read only memory (shown separately in FIG. 9). The read/write memory 126 is used to store various elements and strings of operating data. As earlier noted, the key compartment locking solenoid 66 releasably locks the key container 64 through drive circuit 130. The shackle locking solenoid 44 releasably locks the shackle 24 through the shackle solenoid drive circuit 128.

Dump circuit 131 assures that any charge accumulated in anticipation of firing either the shackle or container solenoids 44, 66 is discharged from the associated energy storage capacitor if power to the lock box is unexpectedly removed. If a user disengages an electronic key from a lock box after requesting a Release Shackle function, but before a voltage threshold set by the lock box microprocessor is reached by a solenoid energy storage capacitor 133 (FIG. 9A), the capacitor is akin to a loaded gun that might go off unexpectedly. While the voltage threshold set by the microprocessor may not have been reached, the energy stored in the capacitor may nonetheless be sufficient to energize the shackle solenoid. Since the microprocessor logic outputs become unstable as the microprocessor power decays to zero, it is possible that the output line which controls firing of the shackle solenoid may jitter into an undesired state, discharging the solenoid energy storage capacitor 133 through the shackle solenoid and causing the shackle to release. To obviate this problem, the solenoid energy storage capacitor 133 is shunted by an SCR 137 that can be triggered to discharge the capacitor 133. If the microprocessor detects a removal of electronic key battery power that is longer than that expected in the data modulation format, the shunt SCR is triggered.

The illustrated lock box microprocessor 124 is a National Semiconductor 842 control oriented processor, an 8-bit processor that performs all control, communications and logic functions. Associated with the processor 124 is an internal 2K ROM and 128 byte RAM. (The ROM is shown separate from the processor 124 in FIG. 9 for clarity of illustration.) The non-volatile read/write memory 126 is an EEPROM that is organized as 256 8-bit bytes.

The lock box microprocessor 124 stores information relating to certain of the lock box operations in a portion of memory 126 termed the "access log." Each entry in the access log includes the identity of the electronic key and the date/time of the operation (obtained from a calendar-clock circuit 134 in the associated electronic key 14). In the illustrated exemplary embodiment, the lock box access log can store information on 43 lock box operations. This log can later be retrieved, in whole or in part, by electronic key 14 or by base 16 for display on a CRT screen or printer associated with the base, or for transfer to the computer 18.

Management of the lock box access log is performed by the lock box microprocessor 124 in conjunction with "head" and "tail" pointers stored in its memory 126. The tail pointer addresses the memory location (i.e. 0 to 42 in relative terms) at which the next access data is to be written. After each such operation, the tail pointer is incremented. After access data is written to memory location 42, the tail pointer points again to 0 and begins overwriting old data. The head pointer then comes into play.

The head pointer always points to the oldest data stored in the memory. After the tail pointer has cycled once through all 43 locations, the head pointer thereafter is incremented to the next address ahead of the tail pointer. Thus the head and tail pointers progress as follows as the 43 locations are written and the tail pointer is recycled: . . . (0,41), (0,42), (1,0) (2,1) (3,2), etc. Whenever a lock box is reinitialized (which usually occurs whenever a lock box is moved from one listed property to another), all the data in the access log is read out, and the head and tail pointers are reset to (0,0).

Lock box 12 is characterized by "lock box characterization instructions" loaded into the lock box memory 126 by a programming base 16. The lock box characterization instructions give the lock box an identity, fix it at certain numerical values and enable it to perform certain functions.

Figure 10:
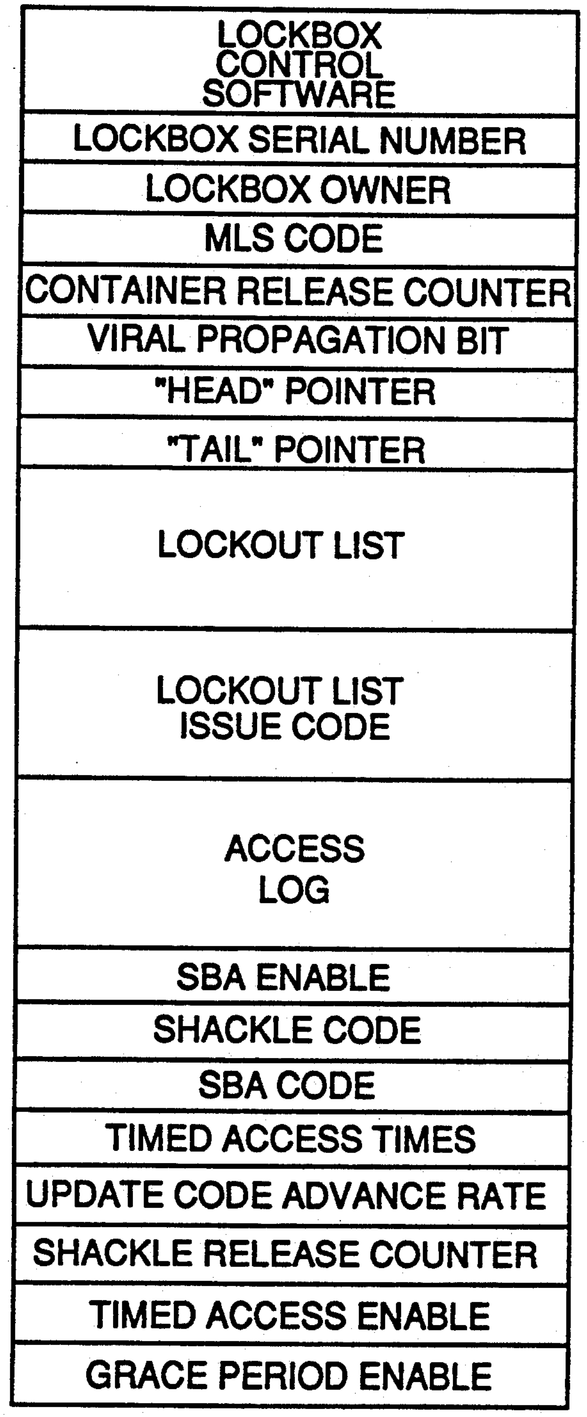
FIG. 10 is a map of the memory used in the lock box of FIG. 1.

As shown in the illustrative lock box memory map in FIG. 10, the identification information loaded with the characterization instructions identifies the Multiple Listing Service (MLS) to which the lock box is assigned, and includes a unique lock box serial (aka ID) number. In the preferred embodiment, the MLS code has four digits, the first two of which are hexadecimal and the last two of which are decimal. A total of 25,600 unique MLS codes can thus be used.

Some of the numerical values that may be loaded into the lock box include a Key Lockout List, Timed Access Times and a Shown by Appointment Code.

Functions enabled by function enable bits in the characterization instructions may include Viral Propagation of Lockout List (discussed below) and Call Before Showing (aka Shown by Appointment).

After its initial characterization by base 16, lock box 12 does not require further maintenance or programming until the lock box is moved to a new location.

Electronic Key

Figure 1A:
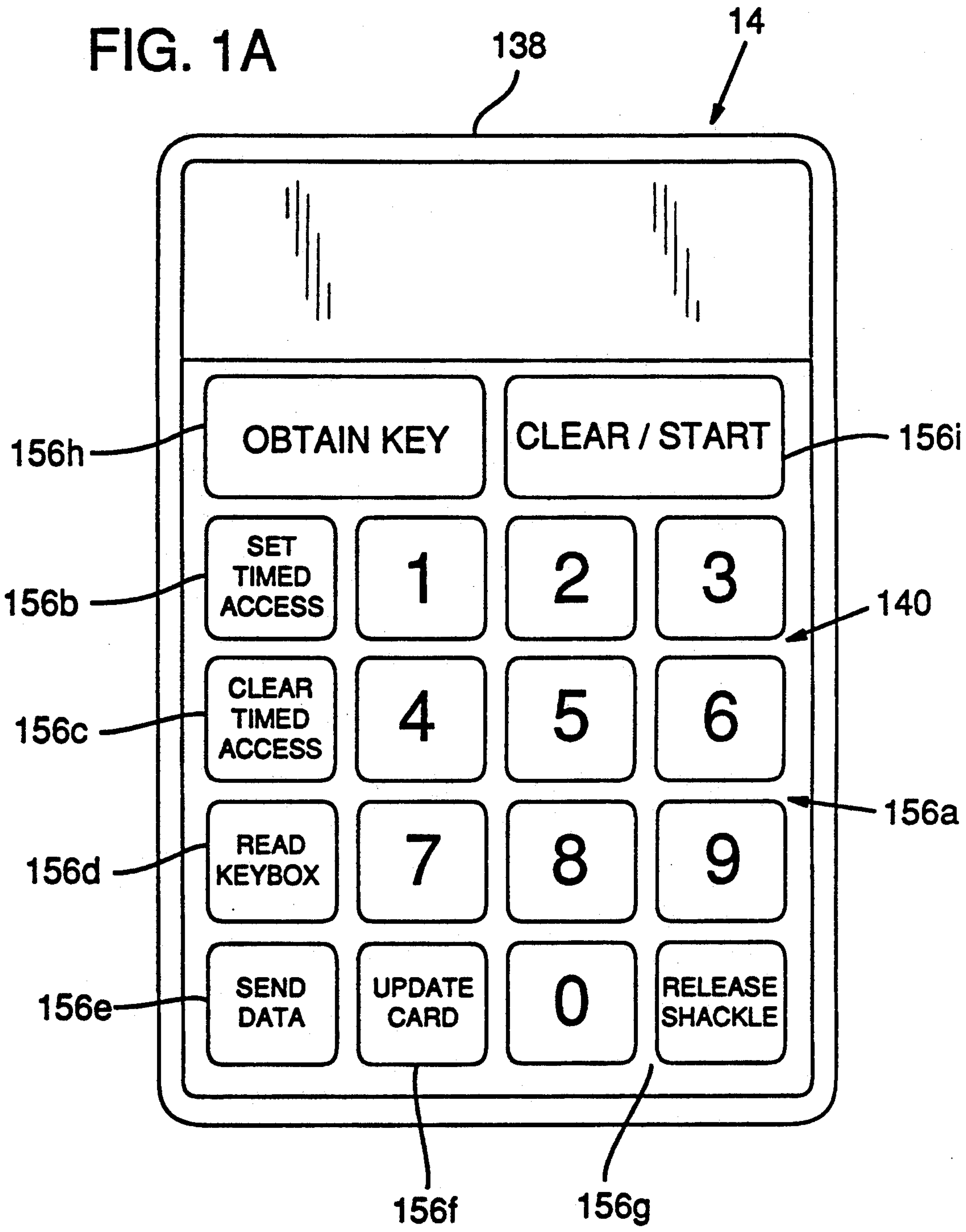
FIG. 1A is a plan view of the front of the electronic key shown in FIG. 1.
Figure 11:
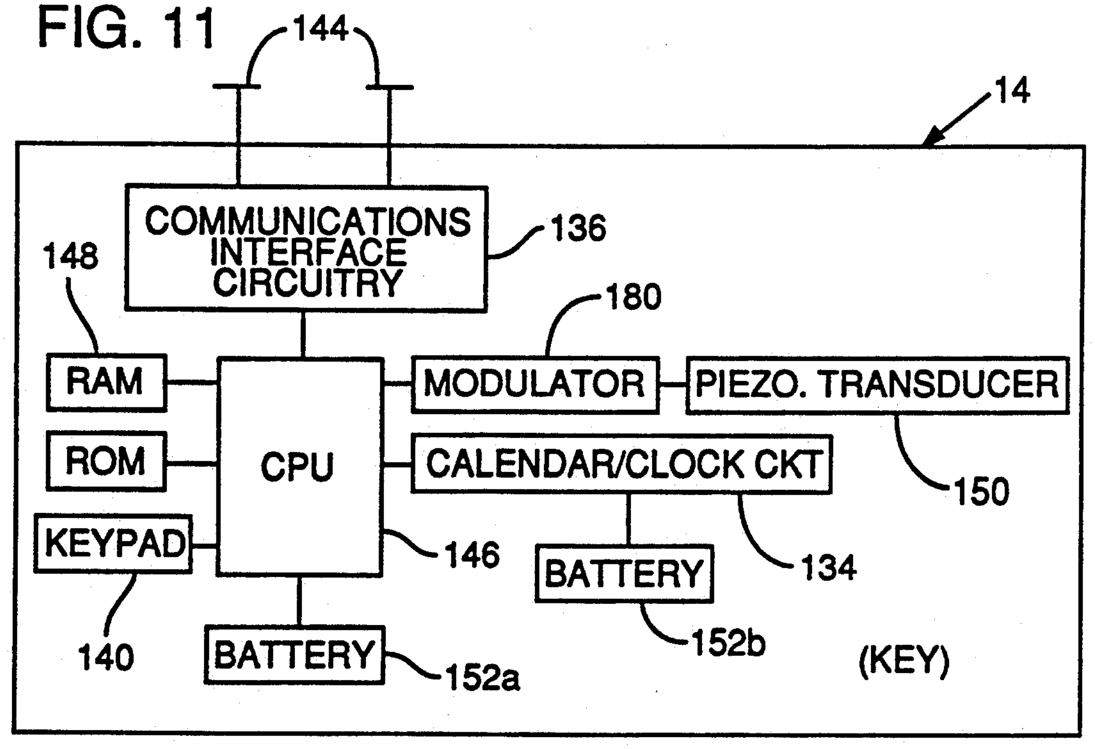
FIG. 11 is a block diagram of circuitry used in the electronic key of FIG. 1.
Figure 11A:
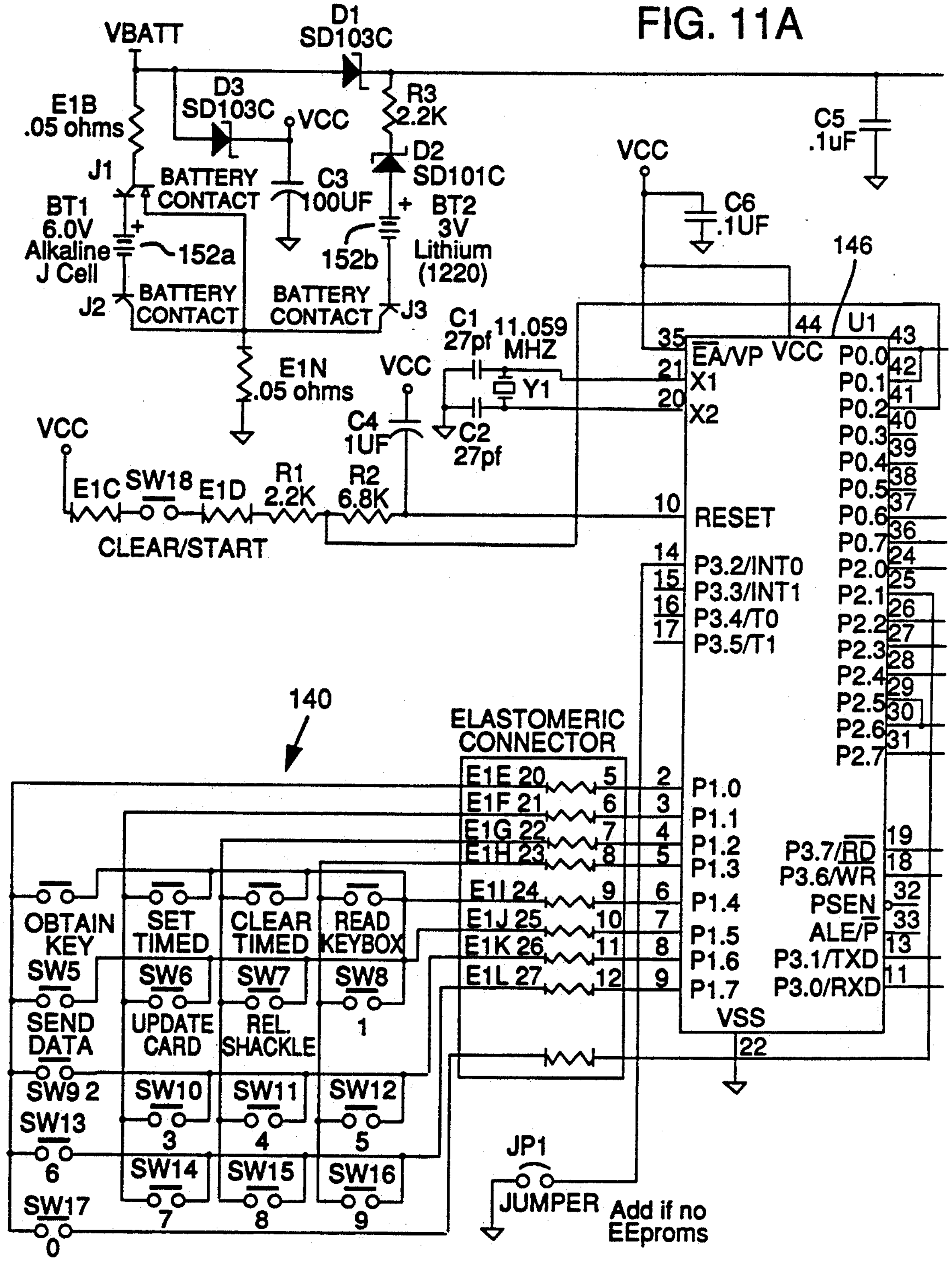
FIGS. 11A and 11B together comprise a schematic diagram of the electronic key of FIG. 1.
Figure 11B:
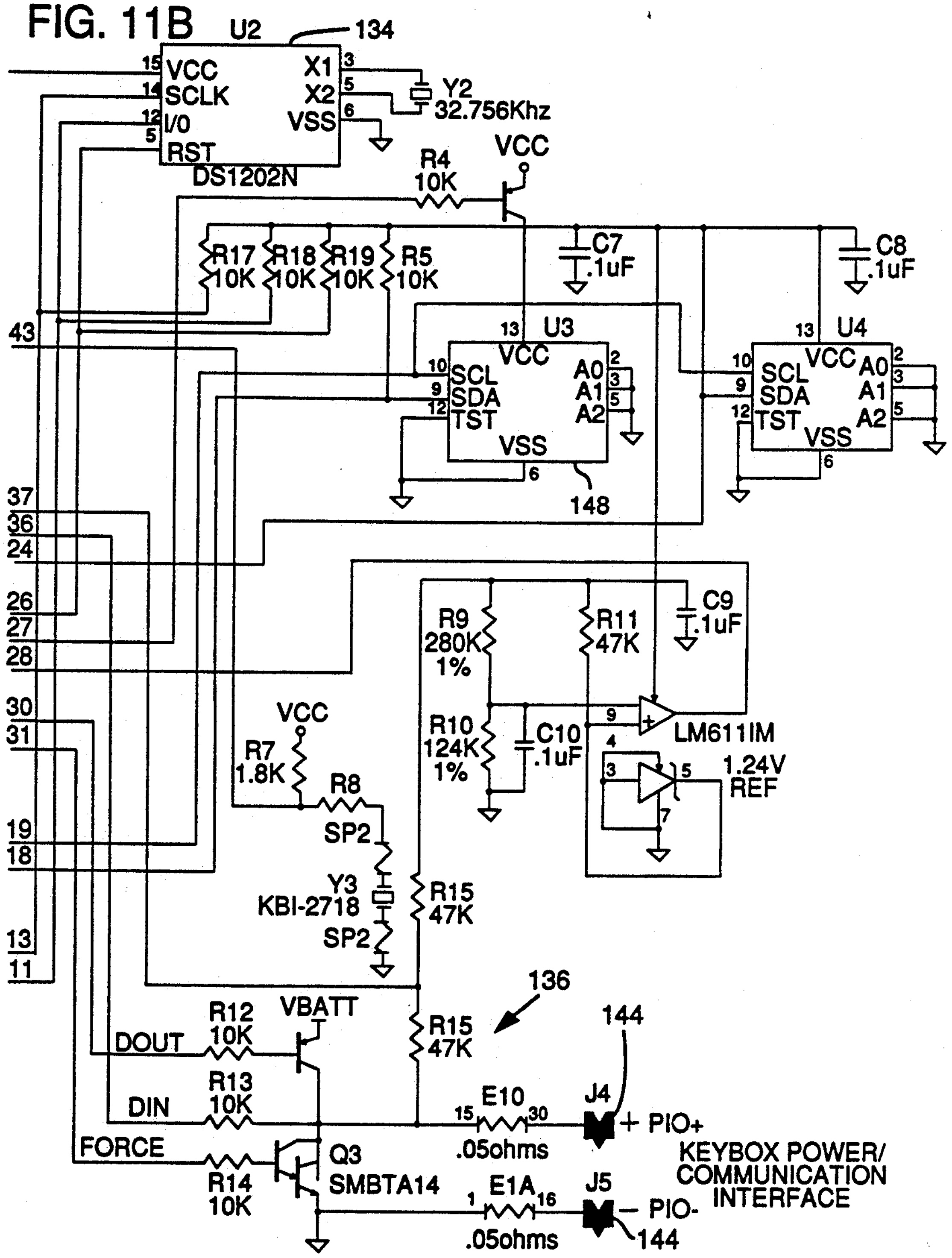

With reference to FIGS. 1 and 1A, electronic key 14 is constructed in a trim polycarbonate enclosure 138 sized to fit conveniently in a user's purse or pocket. The key's circuitry is shown in block diagram form in FIG. 11 and in schematic form in FIGS. 11A/11B and can be seen to include a keypad 140, pair of contacting elements 144, a communications interface circuit 136, a key microprocessor (CPU) 146, a calendar/clock circuit 134, a read/write (RAM) memory 148, a piezoelectric transducer 150, and a pair of batteries **152*a*, 152*b***.

The contacting elements 144 are used to connect to corresponding elements on a lock box or a base. The interface 136 bidirectionally couples data signals between the lock box and key CPU 146 in the form of modulation on a power signal provided from the electronic key to the lock box. The CPU 146 is an Intel 80C51 processor that controls operation of the electronic key according to programming instructions ("key control software") permanently stored in an associated read only memory 154. The calendar/clock circuit 134 provides data corresponding to the year, month, day and time. The illustrated read/write memory 148 is comprised of a small RAM memory inside the calendar/clock circuit 134, together with 2 EEPROMs, the latter of which can each store 2048 (2K) 8-bit bytes of data. (In other embodiments, a single 2K EEPROM can be used, or an EEPROM can be omitted entirely and the small RAM inside the calendar/clock circuit 134 can be used alone.) The transducer 150 is used to provide audible feedback to the user signalling a variety of electronic key conditions. A short high frequency beep serves as an acknowledge tone that sounds after every button press. Three short high frequency beeps serve to indicate the completion of a key sequence, such as pressing of the Release Shackle key after entry of the shackle code. Four short high frequency beeps are emitted to signal that an operation is being (or is about to be) executed. Eight short high frequency beeps indicate the electronic key's readiness to send data. A single long low frequency tone signals an error condition. Finally, a short low frequency tone indicates a low battery condition. The transducer is also used for frequency shift keyed relaying of lockbox access log data to the central computer.

Battery **152*a* is a J-cell that provides power to the electronic key circuitry and, through contacting elements 144, provides power to lock boxes as well. Battery 152*b* provides power to the clock/calendar circuit 134 when the primary battery 152*a*** is replaced.

As shown in FIG. 1A, the buttons on keypad 140 include a 10-key numeric pad **156*a*, a Set Timed Access button 156*b*, a Clear Timed Access button 156*c*, a Read Keybox button 156*d*, a Send Data button 156*e*, an Update Card button 156*f*, a Release Shackle button 156*g*, an Obtain Key button 156*h*, and a Clear/Start button 156*i***.

The Set Timed Access button **156*b* permits a user to restrict the hours during which a lock box will permit access to the dwelling key. The Clear Timed Access button 156*c* allows the user to program a lock box to permit access to the dwelling key at any hour of the day. The Read Keybox button 156*d* permits the electronic key to retrieve into its own memory a copy of part or all of the lock box's access log. The Send Data button 156*e* permits part or all of the data retrieved from lock boxes to be transmitted, by frequency shift keying, over a telephone line that is acoustically coupled to the electronic key's piezoelectric transducer 150. The Update Card button 156*f* is used to enter new update codes and rejuvenation codes (discussed below) into the key memory 148. The Release Shackle button 156*g* requests the lock box to momentarily energize the shackle solenoid 44, permitting the shackle to be released. The Obtain Key button 156*h* requests the lock box to momentarily energize the container solenoid 66. Finally, the Clear/Start button 156*i*** is used to wake the electronic key up from its usual, dormant state.

Electronic key 14 is characterized by "key characterization instructions" loaded into the key memory 148 by a programming base 16. These instructions give the key an identity, fix in it certain numerical values, and enable it to perform certain functions.

Figure 12:
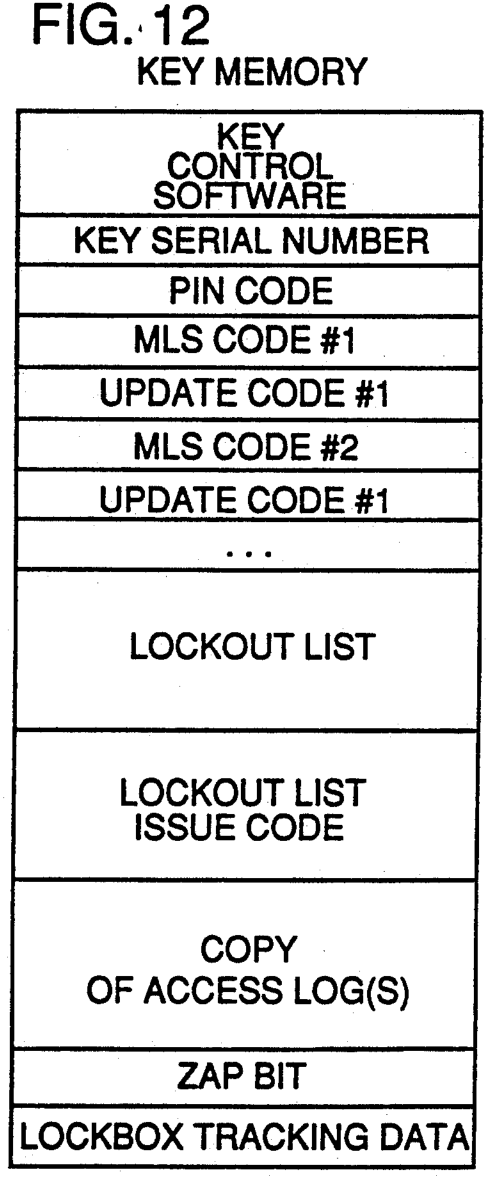
FIG. 12 is a map of the memory used in the electronic key of FIG. 1.

As shown in the illustrative key memory map in FIG. 12, the identification information loaded with the characterization instructions identifies the MLS to which the electronic key is assigned, and includes a unique key serial (aka ID) number.

Some of the numerical values loaded with the key characterization instructions include a four-digit personal identification (PIN) code, a lockout list, and one or more update codes.

After its initial characterization by a programming base 16, electronic key 14 does not require further programming until any time dependent functions, such as update codes, need updating.

Programming Base

Programming base 16 is used in the present invention to read from and write to the system keys 14 and lock boxes 12. The programming base is also used to obtain instructions from, and provide data to the central computer 18.

Figure 13:
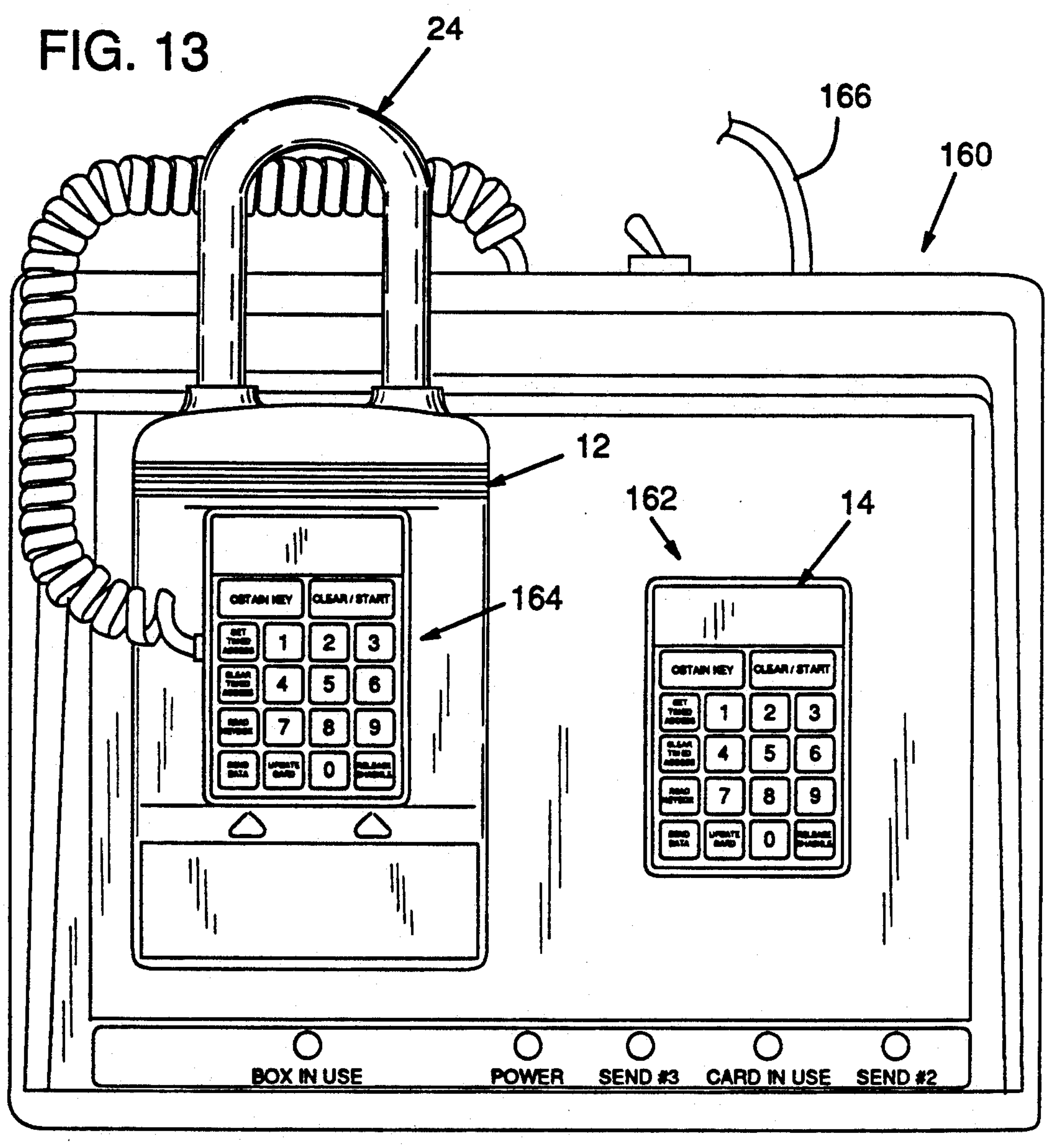
FIG. 13 is an illustration of a programming base used in the illustrated lock box system.
Figure 14:
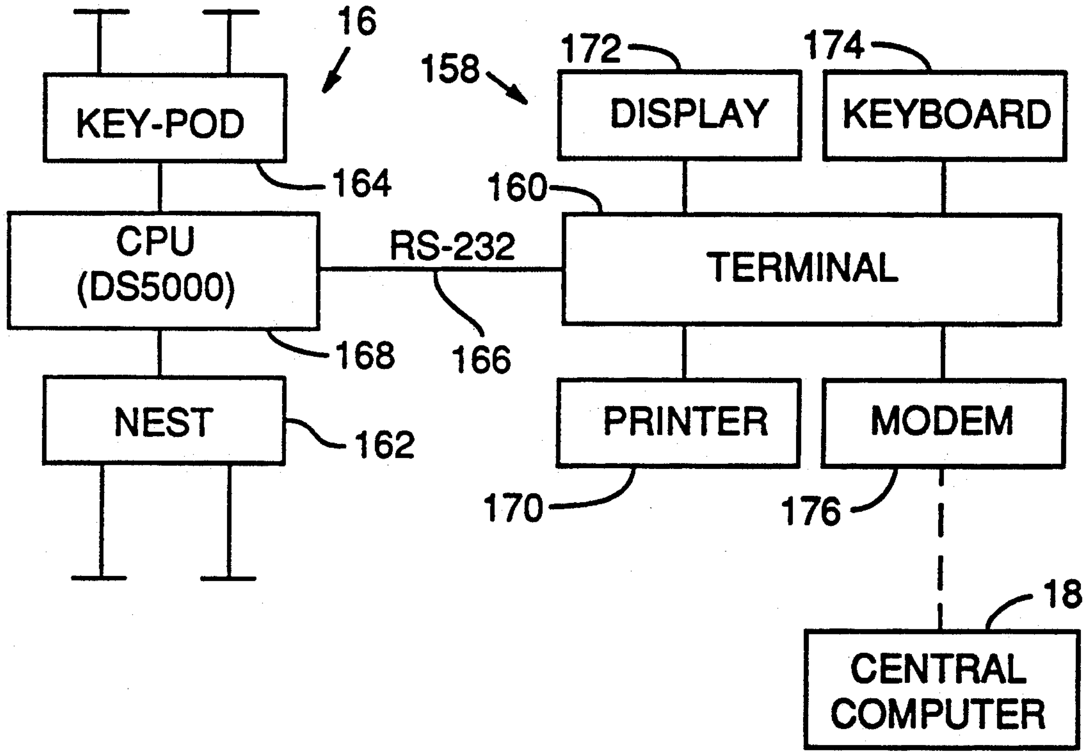
FIG. 14 is a block diagram of circuitry used in the programming base of FIG. 13.

With reference to FIGS. 13 and 14, the programming base 16 has a key nest 162 that is adapted to interface with electronic keys, and thus has a physical layout like that of the lock box into which the electronic keys conventionally nest. The programming base 16 further has an umbilical key-pod 164 that is adapted to interface with system lock boxes, and thus is configured in a shape like that of system keys.

Control of the programming base is effected through a terminal 160 that may be coupled to the base through an RS-232 interface 166. In the illustrated embodiment this terminal is an IBM computer that is separate from the central computer 18. However, in other embodiments, programming bases are connected directly to the central computer through the RS-232 interface 166.

Associated with the terminal 160 are a video display 172, a keyboard 174 and a printer 170. A user is guided through programming base operations by menus displayed on display 172, and enters commands or requested data through the keyboard 174. The printer 170 can be used, for example, to provide a hard copy of access log data that is retrieved from system keys or lock boxes. In the illustrated embodiment, the terminal 160 is equipped with a modem by which data and instructions may be exchanged with the central computer 18.

Referring to FIG. 14, the programming base 16 is built around a Dallas Semiconductor DS5000 CMOS microcontroller 168. This microcontroller has a 32K non-volatile CMOS static RAM memory that is partitioned into a firmware memory, for storing the base's operating software, and a data memory, in which data relayed through the base is stored.

Programming Base Functions

Programming base 16 can provide a variety of functions in the present invention. First, the base can provide a complete set of new characterization instructions for a lock box 12 or an electronic key 14, or can simply modify an existing set of instructions. This is done by interfacing the electronic key or lock box with the programming base 16 and executing a recharacterization program on computer 158. This recharacterization program interrogates the user, using a menu display format on the video display terminal 172, as to which functions are to be enabled, what constants are to be loaded, etc. The characterization instructions generated by this recharacterization program are then relayed from the computer to the programming base, which issues commands programming the read/write memory of the associated electronic key or lock box.

The second function programming base 16 can perform is to retrieve data, such as lock box access log data, from lock boxes or electronic keys and to compile it or relay it to the central computer 18.

The programming base can also be used for a variety of other purposes, such as for relaying diagnostic maintenance log data from electronic keys or lock boxes to the central computer 18, and for synchronizing the calendar-clock circuit 134 in the electronic key with a master calendar-clock maintained by the central computer 18.

Programming Base Security

To enhance system security, the firmware memory partition of the programming base's DS5000 microcontroller 168 is provided with an electronic lock by which its contents cannot be discerned nor replaced without first unlocking the electronic lock. Unlocking the lock automatically erases the instructions previously stored in the firmware partition. Thus, if anyone seeks to read out the data stored in the microcontroller 168, the data is destroyed.

If the programming base is to be reprogrammed, the electronic lock is unlocked, erasing the previously stored data. New data can then be loaded by applying assembly language instructions to the RS-232 interface line 166. An opportunity is then provided to issue a command to the programming base to cause the memory to become relocked. If the microprocessor memory is left in its unlocked state, then the microprocessor instructions cause it to erase the memory upon the first attempt to operate the base. By this arrangement, instructions loaded into the memory but left unlocked are soon destroyed.

ADDITIONAL FEATURES

Multiple MLS Capability

In the preferred form of the invention, a system component (lock box, electronic key or programming base) can be associated with more than one MLS. Such multiple MLS capability is important in large metropolitan areas in which a single brokerage may show properties listed by several different multiple listing services.

To effect multiple MLS capability, the memories of the system components are arranged to store data for up to six different multiple listing services. An electronic key, for example, may have six multiple listing identifier data, each of which has an update code corresponding thereto. All of this data is exchanged in the lock box/electronic key interaction and the requested operation is authorized only if (1) the lock box is associated with a MLS included among the electronic key's six multiple listing services; (2) the key update code corresponding to that MLS is timely; and (3) any other necessary criteria (Timed Access, Shown By Appointment, Lockout Lists) are met.

Lockout List

In certain instances, it may be desirable to lock out certain agents and thereby deny them access to a listed property. In the preferred embodiment, read/write memory 126 of lock box 12 contains a list of electronic key identification data that, although the electronic keys so identified may otherwise be authorized, are to be locked out. The identification data received from the accessing electronic key is compared against this list by the lock box microprocessor 124. If the accessing key's identification data corresponds with data found in this list, lock box 12 will refuse to execute any lock box functions requested by the electronic key.

If desired, the lock box microprocessor 124 can be programmed to disable locked out electronic keys that attempt to execute a function on the lock box. In the exemplary embodiment, the lock box microprocessor 124 responds to each such pre-identified key with a "zap" instruction to the key. This instruction causes a "zap" bit in the electronic key memory 148 to be set. The key's microprocessor 146 checks this zap bit each time the key is awakened, and if it is found to be set the key emits its error tone and returns to sleep. In the illustrated embodiment, this key zap feature is enabled by the same enable bit in the lock box memory that enables viral spreading of the lockout list.

It will be recognized that the lockout list data stored in each lock box may need to be updated frequently in order to be effective in locking out undesired keys. In one form of the invention, key 14 has a portion of its read/write memory 148 dedicated to storing a lockout list. Stored with this list is an issue code indicating the relative timeliness of the lockout list data. An issue code is also stored with the lockout list data stored in lock box 22 indicating its relative timeliness. Whenever electronic key 14 and lock box 12 communicate, these issue codes are compared by the key microprocessor 146 or the lock box microprocessor 124. If it is determined that the lockout list data stored in the electronic key 14 is "fresher" than that stored in the lock box 22, the key's lockout list data, including the issue code, is transferred to the lock box read/write memory 126, where it overwrites the "stale" lockout list data previously stored there. If it is determined that the lockout list data stored in lock box 12 is "fresher" than that stored in the key 14, the lock box's lockout list data, including the issue code, is transferred to the key read/write memory 148 where it overwrites the "stale" lockout list data previously stored there. By this technique, one unit updates the other so that each has the newer lockout list data. This technique is referred to herein as a "viral" lockout list propagation technique.

In the preferred embodiment, the issue code is an integer in the range of 0 to 65,535. The relative freshness of one lockout list as opposed to another is determined by examining which lockout list has the higher issue code. The issue codes do not "roll" from 65,535 back to zero. However, the range of possible issue codes is large enough so that, in their normal incrementation, there will be adequate issue codes for many decades of use.

It will be recognized that the system may be subject to sabotage if, for example, a null lockout list (i.e. one in which no keys are locked out) is assigned an issue code of 65,535 and introduced to the system. As this list propagates through the system, the lockout feature will be effectively eliminated.

To guard against this eventuality, the lock and key microprocessors are programmed to not overwrite one lockout list with another if the difference in issue codes is greater than 256. By this arrangement, a saboteur's lockout list with issue code 65,535 will be ignored and not virally propagated through the system.

In some instances, it may be desired that a lockout list not be virally propagated. This may be the case if, for example, it is desired to lock a single agent out of a single house, but not bar his access to all the other houses in the system. An enable bit in the lock box characterization instructions is used to determine whether the lockout list is to be virally propagated or not.

Finally, since electronic keys from a plurality of multiple listing services might be authorized to open a given lock box, provision is made to tag each lockout list carried by a key with data indicating the MLS to which it relates. Unless the MLS data associated with a key's lockout list matches that of the lock box owner, no exchange of lockout list data will take place.

Container and Shackle Release Counter

In the illustrated form of the invention, one of the memory locations in lock box read/write memory 126 serves as a container release counter that is incremented each time the key container is released. This counter has a large capacity, such as 65,635. The count accumulated in this memory location provides an indication of the lock box usage and is helpful in determining the lock box's remaining life expectancy.

A similar counter tracks the number of times the shackle has been released.

Update Codes

The illustrated lock box system uses an update code technique like that disclosed in U.S. Pat. No. 4,864,115 to limit the time period during which an electronic key can validly be used. If a new update code is not entered into keypad 140 periodically, the key will be rendered ineffective.

According to this technique, an update code is stored in each electronic key. Whenever a user attempts to access the key compartment of a lock box, the update code in the electronic key is checked in an algorithmic procedure that utilizes the current date (from calendar/clock circuit 134), the key's serial number, and the associated MLS identification data, to confirm the key's validity. This checking occurs in the lock box in the illustrated embodiment. If the update code is not timely, the requested function will be denied.

In the prior art, the update code is effective for a limited period of time and expires on a "call-in" date. In an exemplary system, the period is a month in duration, and the call-in date is the first of the month. In order to maintain the key's utility, a user must call the MLS and solicit a new update code (by appropriate identification signals entered on the telephone touch tone pad) on the first day of the new month. A voice synthesizer at the central computer 18 then provides the new update code (seven digits in the illustrated embodiment). If, for some reason, the computer at the MLS is inaccessible, the agent would effectively be locked out of the system until access to the computer could be gained. According to the present invention, a grace period feature can be selectably enabled wherein the update code for the next month can be entered early, without debilitating the electronic key for the remainder of the present month.

According to the present invention, if the update code expiration date is the first of the month, the computer 18 may be programmed to provide update codes for the coming month up to five days early, such as on the 26th of the preceding month. The user keys this update code into the keypad and follows it with a press of the Update Card button 156g. This new update code then overwrites the update code for the present month in the key read/write memory 148.

With the new update code stored in the electronic key memory, the lock box first executes the above-referenced algorithm with the current date and finds the update code unacceptable. The lock box then performs the same operation a second time, but using date data that is temporarily incremented by one month. If the newly-entered access code is valid for the next month, this second procedure will indicate the key's validity and the operation requested by the key will be allowed. By the foregoing arrangement, a grace period of up to a month (in the illustrated embodiment) can be implemented.

System Date Security

Since the current date is used in the update code procedure to determine whether a key will be allowed to access a lock box, calendar data is considered a sensitive system variable. Accordingly, software used in the system components restricts the ability to change the date and time.

First, it should be noted that each electronic key has a calendar/clock circuit 134 therein, and the operation of synchronizing the key's time data with that of a programming base is an unrestricted operation that can be freely performed.

The time data in the programming base, however, cannot generally be changed, with two exceptions. The first exception is a first limited class of users, to whom authority is granted to change the time up to 24 hours in any given month. Such users can thus, for example, correct the time in a programming base that has been shipped from a different time zone. Only a second, much more restricted class of users have authority to change the time and date arbitrarily. (A user's authority is determined by security key words stored in the system components used by that person. As described below, these security key words are used in a challenge/response mechanism by which only certain devices are permitted to perform certain function.)

By this arrangement of securing the system date, the opportunity for sabotage by alteration of date data is greatly reduced.

Downloading Access Log

Data transferred from a lock box and stored in an electronic key can be read out in one of two ways. The first is over a telephone line to the central computer. This technique employs the modulator circuitry 180 in the key to frequency shift key an audio carrier signal in accordance with the access log data and drive the piezoelectric transducer 150. A demodulator is connected to the telephone lines at the central computer and provides the demodulated data signal to the central computer. It has been found that this peizoelectric FSK arrangement permits a data transfer rate approximately ten times greater than that achievable with DTMF tones.

Desirably, the FSK data is formatted into packets that include error detecting and correcting check words. If the central computer detects an error in the received transmission, it first tries to correct the error using the error correcting check word. Those packets that cannot be recovered in this fashion are marked as bad. The computer than requests that the full transmission be repeated. In the preferred embodiment, this request is made at the conclusion of data transmission by a voice synthesizer associated with the central computer that announces over the phone lines that the data was not correctly received. The user then instructs the key to repeat the transmission. The next transmission is similarly monitored for errors by the central computer. Errors in packets that were earlier received correctly are ignored. If a packet is received again with an error, the central computer again requests the data be retransmitted. This process is repeated until each of the packets has been received, at least once, correctly. The central computer then assembles from all this received data a set of data that is correct and complete.

The second technique for relaying data from an electronic key is a transfer to a programming base using the bidirectional wired interface. This wired interface functions with the programming base just as it does with the lock box (described below).

Challenge-Response Mechanisms

To enhance security, all communications between system components are preceded by a challenge-response test to assure the authenticity and authority of the cooperating device. The unit with the most to risk (i.e. a programming base when communicating with a remote computer, a key/lock box when communicating with a programming base, and a lock box when communicating with an electronic key) sends a pseudo random challenge word in response to a solicitation from the other unit. The soliciting unit returns to the challenging unit a response word that is based, in part, on the challenge word. The challenging unit checks this response word for an anticipated correspondence with the challenge word and authorizes further communications only if the response word is as expected.

In the preferred embodiment, there are two different challenge/response mechanisms. A first is used in transactions between an electronic key and a lock box. This mechanism is relatively simple due to the processing constraints of the small lock box microprocessor 124 and involves the straightforward application of a mathematical algorithm to the pseudo random challenge word.

A second challenge response mechanism, employing a more complex algorithm, is used in transactions between a programming base and a computer. This latter algorithm bases the response word not just on the challenge word, but also on the serial number and MLS identification data of the programming base (which are relayed to the central computer as part of the communications protocol) and on the "level" of the challenge (discussed below) and on the MLS' corresponding "security key word" (also discussed below) for that level.

In one embodiment of the invention, if the challenge word does not correspond to the response word in a predetermined fashion, the challenging unit transfers to the soliciting unit dummy data that resembles the expected data but is ineffective for any purpose.

As noted above, the requisite correspondence between a challenge word and a response word in programming base/central computer communications is determined, at least in part, upon data—such as the MLS identification data—that is uniquely assigned to a proprietor of the system. By this arrangement, a computer 18 of a first MLS cannot, for example, obtain sensitive data from a programming base 16 of another MLS.

In the preferred form of the invention, certain programming base/central computer transactions are restricted to a relatively limited class of users. To effect this segregation, different operations are classified among different levels (which may be numbered in decreasing levels of security 1-3 for purposes of illustration). The level(s) on which a computer may transact with a base is determined by a security key word stored in the computer. A security key word associated with level 3 will permit a computer to transact operations classified as level 3 with a programming base. A security word associated with level 2 will permit a computer to transact operations classified as levels 2 or 3 with a programming base, etc.

To receive permission to perform a restricted operation, the soliciting computer indicates to the programming base the level of authorization that is sought. A challenge word is then issued by the programming base. Based on the security key word stored (in encrypted fashion) in the central computer, together with the other data noted above, the computer generates a corresponding response word and returns it to the programming base. If the security key word stored in the computer is associated with a level equal to or higher in security with that of the requested level, the returned response word will correspond correctly to the issued challenge word and the requested transaction will be authorized. By this arrangement, the computer is restricted, by the security key word with which it is provided, in the levels of operations that it can successfully request.

As noted, the security key word on which the challenge/response mechanism is based is stored in the central computer memory. The security key words themselves are generated according to an algorithm that is stored in every programming base 16. However, only bases that have their MLS identification data set to a special number can fully exercise this capability, and such bases are usually maintained only by the product manufacturer. The remainder of bases can use this capability only in a limited capacity, namely to generate the security key words needed to check the correctness of response words returned by a central computer. There is no provision by which the security key codes generated in such bases can be divulged.

This provision of security key word-generating capability in all bases provides a number of practical advantages. One is that no person has knowledge of the security keys, nor the manner by which they are generated. Issues such as employee turnover and physical security of printed records are thus obviated. The key-generating algorithm itself is safely stored in the base memory which, as detailed below, is secure against tampering or inspection. Further, each programming base is initially identical to each other programming base, regardless of the specific multiple listing services with which it might ultimately be used. Finally, while any base can be authorized to exercise the security key-generating capability, the change in its MLS code needed to do so is an operation that is reserved to the product manufacturer.

Device Initialization

The data identifying a device's assigned MLS is set to a default value during manufacture. Before the device can be used, this data must be changed to correspond to the MLS in which the device will be used.

In accordance with the present invention, the programming bases do not normally have the capability to change a device's MLS data unless that data is set to its default value. If such a condition is detected, the user is prompted to identify the MLS with which the device will be used. Until this MLS data is loaded, the device's utility is limited. Once this MLS data is loaded, it cannot thereafter be changed.

The foregoing procedure is used both to initialize new lock boxes and electronic keys with a programming base, and to initialize new programming bases from a computer.

This initialization procedure greatly simplifies system administration, since generic devices can be shipped immediately from the manufacturer without programming delays, and device initialization is readily accomplished at the same time the customer loads the device characterization instructions.

Card Tracking

In the preferred embodiment, the key memory 126 includes a partition devoted to storing lock box identification data. This data identifies the lock boxes with which the electronic key has most recently exchanged data (regardless of requested operation). The size of this partition can be set in tandem with the size of a partition dedicated to storing lock box access logs. An increase in the size of one partition requires a corresponding decrease in the size of the other.

In one form of the invention, new data simply overwrites old when the tracking data partition becomes full. In other forms of the invention, however, the electronic key is programmed to disable itself when the tracking partition becomes full. This latter embodiment is useful to assure that the tracking data is periodically downloaded to the central computer. Until the data is downloaded, the electronic key is ineffective. Upon downloading, the key is reset to permit its continued operation.

Among its other advantages, this feature permits a key to be validated for a limited number of lock box transactions, which is useful when it is desired to issue a key with limited utility.

Battery Monitoring

The voltage of the electronic key's primary battery 152*a* is checked by the key microprocessor 146 each time the Clear/Start button 156*i* is pressed, and again during operations that present heavy electrical loads (i.e. Obtain Key, Release Shackle and FSK transmission). If the battery voltage is determined to be below four volts, the operation is terminated and the electronic key emits a low battery tone.

Send Data

The Send Data operation has four variants. In the first, only the last five entries obtained from the most recently-read lock box are sent. In the second, all the data from the most recently-read lock box is sent. In the third, all the data from all read lock boxes is sent. In the fourth, the tracking list of lock boxes visited by the electronic key is sent.

The first variant is executed by pressing the Clear/Start button 156*i*, followed by the Send Data button 156*e*.

The second variant is executed by pressing a digit between 0 and 8 between pressing the Clear/Start button 156*i* and pressing the Send Data button 156*e*.

The third variant is executed by pressing the digit 0 between pressing the Clear/Start button 156*i* and pressing the Send Data button 156*e*.

Finally, the fourth variant is executed by pressing the digit 9 between pressing the Clear/Start button 156*i* and pressing the Send Data button 156*e*.

Key Expiration

In the preferred embodiment of the invention, each electronic key can be assigned an expiration date on which the key becomes unable to access lock boxes. The key is rejuvenated by entry of an eight digit rejuvenation code. This is effected by pressing the Clear/Start button 156*i*, followed by an eight digit rejuvenation code, followed by the Update Card button 156*f*.

It will be recognized that this feature is independent of the update code feature discussed above. The update code feature determines the electronic key's validity within certain multiple listing services. The expiration date feature applies irrespective of the MLS to which a lock box may be assigned.

System Data Communications

Communications between electronic keys, lock boxes and programming bases are described below with reference to FIGS. 15–22. For expository convenience, only lock box/electronic key communications are explicitly addressed. However, since the programming base emulates both of these components, communications with the programming base proceeds in the same fashion. In this discussion the electronic key is denoted the "master" and the lock box is denoted the "slave."

Figure 15:
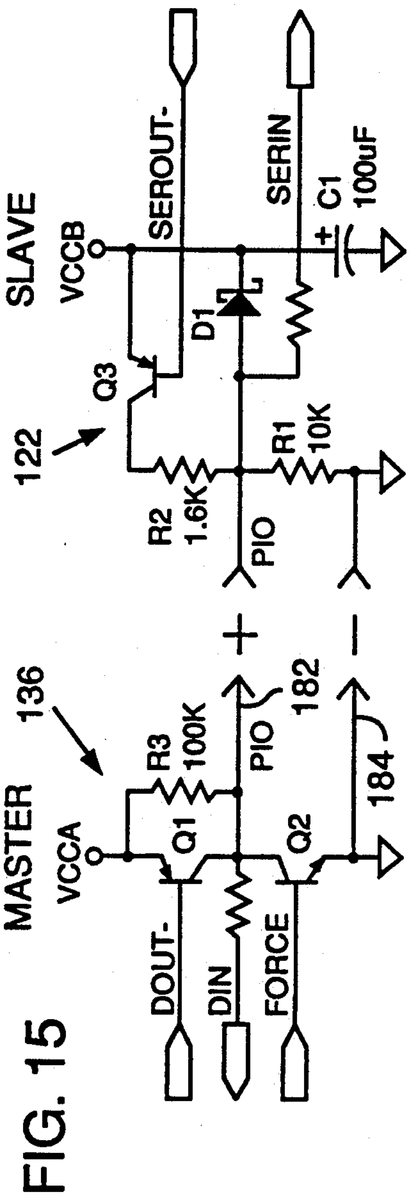
FIGS. 15–22 are illustrations detailing the communications interface and protocol between system components.

Referring first to FIG. 15, bidirectional communications are accomplished through the pair of metal conductors 110 that also ordinarily supply power to the slave device. All communications are under direct control of the master, which supplies a reference serial clock. This reference clock is provided by alternately connecting the "+" (aka PIO) terminal 182 of conductors 110 to a high current source and disabling this terminal. In practice, supplying power is accomplished by driving the DOUT line low, turning on Q1 while driving FORCE low, and turning off Q2. Removing drive to the PIO terminal is done by setting DOUT high and FORCE high (turning off Q1) and turning on Q2 and then setting FORCE low (turning off Q2). Briefly driving the line low with FORCE is done to speed up the negative transition of the terminal.

In the slave, there exists a 10-kilohm resistor (R1) between the "plus" and "minus" terminals 182, 184. This termination serves two purposes: to allow the master to detect the electrical connection initially (slave not powered) and to provide an appropriate logic level when the master has turned the "plus" terminal 182 off. In this way, pulses are passed from the master to slave, with the "off" periods' timing passing data.

In addition to the passive 10-kilohm resistance from the "+" to "−" terminals, the slave also has a means to strongly pull up the "+" terminal. It does this under firmware control by driving SEROUT low, turning on Q3. This is used to perform the slave's one and only serial line function — sending a bit. The presence or absence of this bit can be detected by the master when it is not driving the "+" line high.

The first step in establishing communications is to detect the presence of a device. The master senses the presence of a connection to a device by attempting to detect the 10-kilohm load resistor R1 in the slave's two-wire connection. It turns off Q1 and Q2 and monitors the state of the DIN line. With no external load applied between the "+" terminal and ground, this signal will be high because of a weak pull-up resistor R3. Connecting a lock box to the key terminals results in DIN being read as low.

Once the slave connection is detected, the master supplies power to the "+" terminal and delays a minimum time to ensure that the slave is under power and operation is stabilized before proceeding to the next phase — initialization.

Once a physical connection has been detected, the next step is to determine the general functionality of the combined hardware and firmware (master and slave). The hardware determination step is performed by the master for a given operation by sending a burst of pulses. The master starts by transmitting a packet of eight ($n_1$) pulses and carefully monitoring the state of the "+" line during each period it is not driving the line — the bit cell.

The slave ordinarily carefully measures the duration of the first pulse for later use in pulse width modulation (PWM) communications, and then sends a response pulse in each of the remaining bit cells until the master pauses briefly ($t_{10}$).

Figure 16:
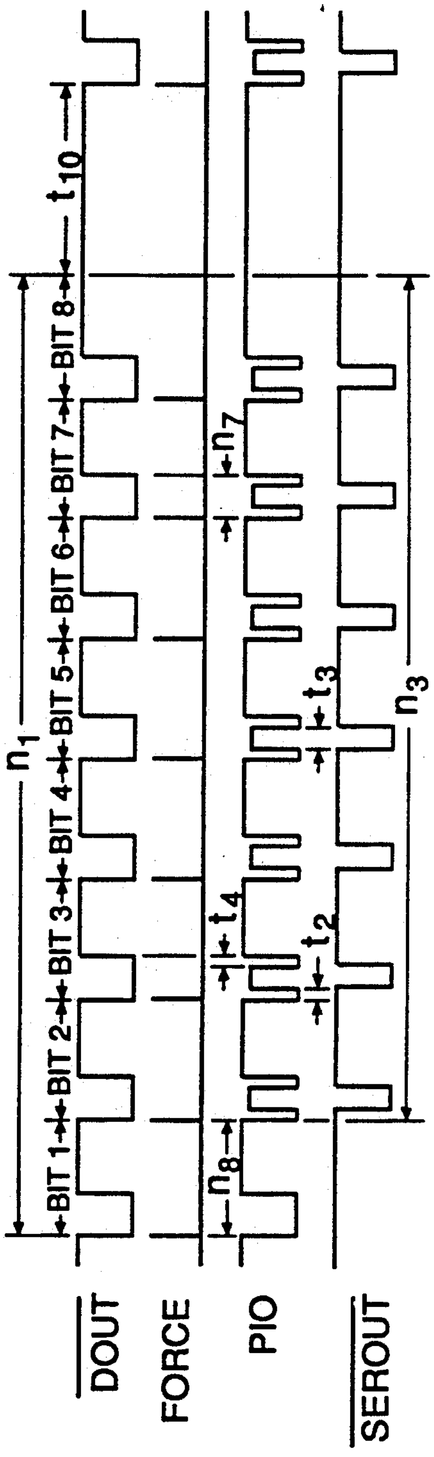

As shown in FIG. 16, the master will see exactly three edges in every bit cell, except the first $n_8$, which will see a single edge. (The number of level changes within a bit cell excludes any FORCE-driven initial negative transition, and also excludes the master-control transition to the high (inactive) state.)

Figure 17:
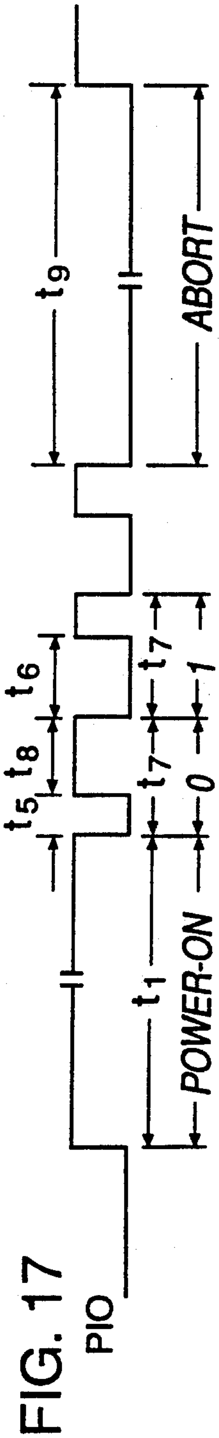
Figure 18:
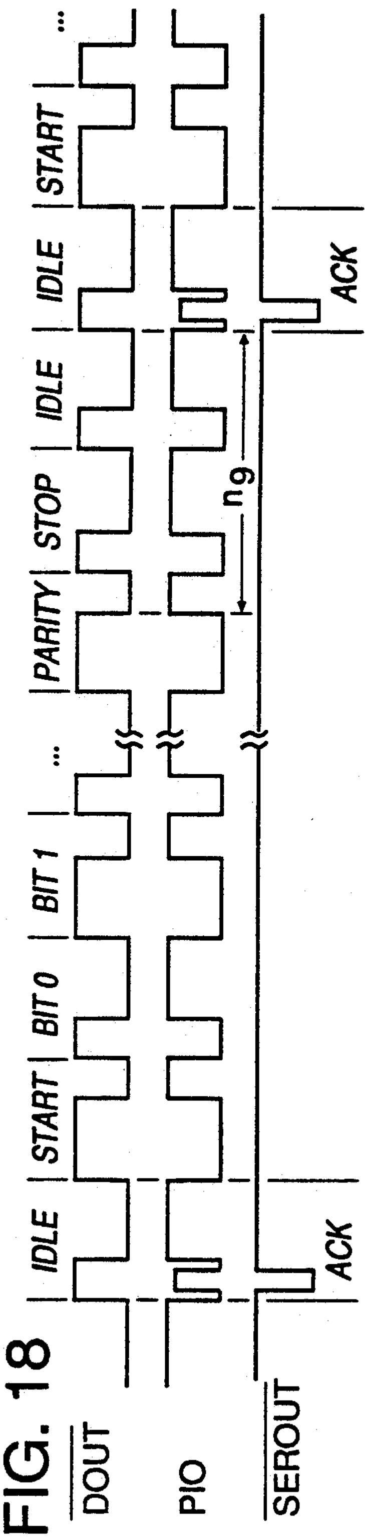
Figure 19:
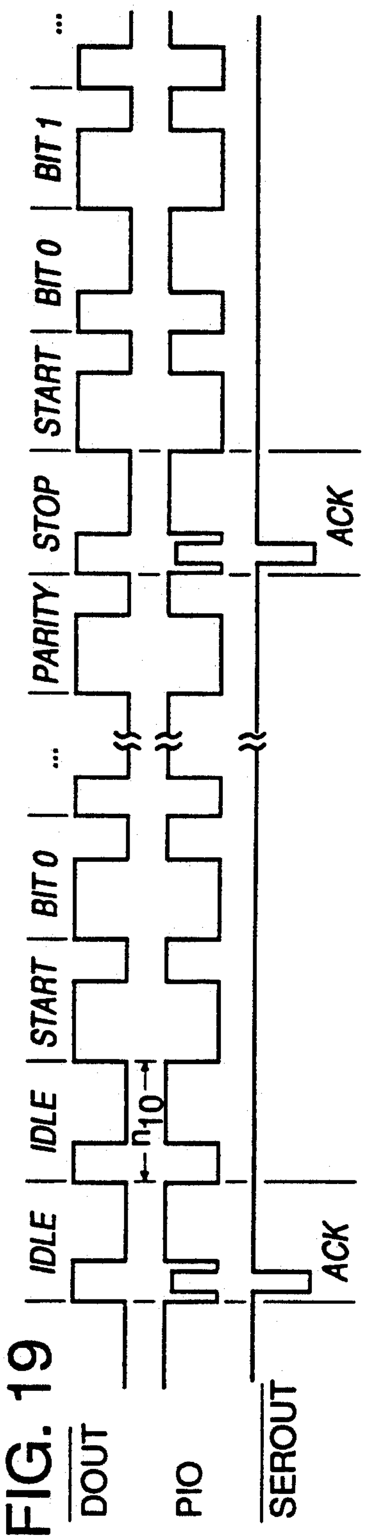

By definition, the overall pulse width for bits in the initialization phase represents logical "zero" PWM outputs. A logical "zero" pulse has a duration of $t_5$ and a logical "1" pulse has a duration of $t_6$. The overall cycle time of a bit cell has a duration of $t_7$. This is shown in FIG. 17.

The master transmits data to the slave using an active-low PWM technique for each bit. Data is grouped into 11-bit packets and these are transmitted using a clocked asynchronous scheme. Each packet contains a start bit (logic 1), eight data bits (LSB to MSB), an odd parity bit (the parity bit is set if the number of "1" bits in the data is even, cleared otherwise) and a stop bit (logic 0). Between asynchronous packets, the master sends continuous zeros, or holds the line statically high. The slave signals that it is ready to receive a character packet by sending a pulse during one of the idle (0) bit cells. This bit is also called a "go ahead" bit. The master ordinarily begins transmission of the character packet no later than the next bit cell, but the slave does not automatically expect that the next bit will be a start bit but waits for an actual PWM start bit. Once character packet transmission has begun, the slave can actually acknowledge its readiness to accept the next byte (its go ahead) while the master is transmitting the stop bit of the previous packet. If no additional packets are to be sent, the final go ahead is optional and ignored. These details can be best understood with reference to FIGS. 18 and 19.

Figure 20:
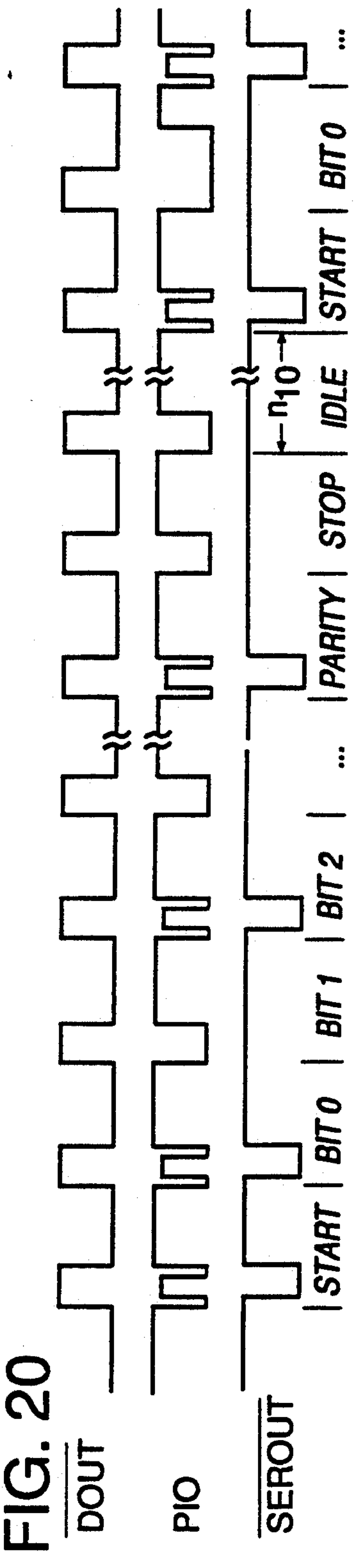
Figure 21:
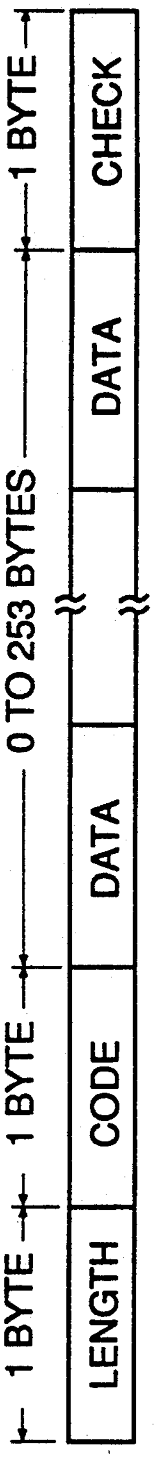

Referring next to FIG. 20, the slave transmits data using a clocked, asynchronous pulse-present scheme. The clock is supplied by the master and the data is sent in the same 11-bit packet format; only the encoding method is different. The slave transmits a "1" by sending a response pulse inside a "0" bit cell. A "0" is sent by doing nothing during the cell time. No master acknowledgement is required as it is in control of the packet timing by supplying the clock.

Communication between master and slave takes the form of blocks (FIG. 21), which are composed of character packets sent as defined above. Each block is composed of four fields: the block length, a code field, a data field, and a block check field. The block length field is one byte in length and contains the binary value of the number of bytes in the entire block, including itself. A value of 0 indicates a block of 256 bytes. The code field is one byte in length and contains command, result and status codes. The data field contains a variable number of bytes with a minimum length of 0 and a maximum length supportable by the protocol of 253 bytes. The block check is a single byte check value formed from all of the bytes in the block except itself, and is used to verify data validity. Blocks under this protocol can range in length from 3 to 256 bytes, though by practical application, the lengths will depend on usage and device capability and not all devices are required to receive a maximum block length.

Figure 22:
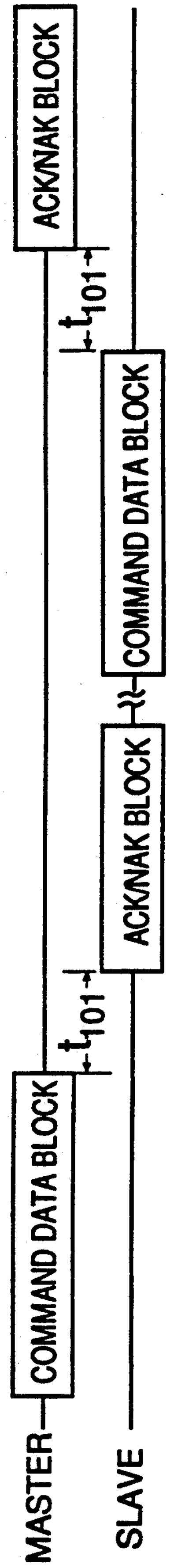

As each block containing data or commands is transmitted, either master to slave or slave to master, it is required to be explicitly accepted by the receiving device before proceeding. Acknowledgement is performed by transmitting a three-byte frame with a code ("op-code") indicating acknowledgement (ACK) or a code indicating a negative acknowledgement (NAK) and no data field (FIG. 22). Upon reception of a NAK or other non-acknowledgement condition, the originating device will re-transmit the previous block until it is either positively acknowledged, the transmission is abandoned, or the function in progress is aborted.

All communications start in a fixed sequence. The device to send first is always the slave, and the first block sent is an ID and security block. The required master response is a block containing the master's identity and the security response data.

The slave ID block contains:

type/family identifier (one byte);
product identifier (one byte);
firmware revision level (one byte);
issue number (two bytes);
issue data length (one byte);
issue data (zero or more bytes);
challenge data (six bytes); and
serial number (zero if not serialized, one-six bytes).

The master ID block contains the following data:

type family identifier (one byte);
product identifier (one byte);
firmware revision level (one byte);
issue number (two bytes);
issue data length (one byte);
issue data (zero or more bytes);
response to challenge data (six bytes); and
serial number (zero if not serialized, one-six bytes).

The type/family identifier contains two values packed into a single byte. The most significant three bits contain the type code, the least significant five bits contain the family identifier. The type identifier specifies capabilities relating to communications and provides compatibility between different generations of lock boxes and keys having different communications capabilities.

The family code identifies a common level of functionality for devices as a system. Again, this relates to the product generation and assures compatibility among generations.

The product identifier is a code that defines an actual device by class: key, lock box, programming base, and so on. This number is not necessarily unique across all device families, but the combination of type, family and product codes will be unique and specifically identify all device designs.

The firmware revision is the current release number, defined to be two packed binary coded decimal digits, the most significant digit indicating the major release level and the least significant digit indicating the minor release level.

The issue number field contains an area-wide number, commonly used for in-field re-keying or other updates. If the number is not used for a given application, it is set to zero. Following the issue number is the issue length field, which specifies the number of bytes of data to follow. The length field value can include zero, while means that no data follows. If the length is non-zero, the next field is the update data, which is application-specific in length and content. Ordinarily, the first byte(s) of this data identify it in some manner.

If viral propagation is enabled, the lockout data is relayed through these issue data fields. In this case, the issue data length is 17 in value and contains a 2-byte lockout identity and 5 3-byte lockout list entries.

The password and password response fields implement a challenge-response procedure to establish device authenticity.

The serial number is a unique identifier for the actual device sending the data. If the device is not serialized, the entire field will be zero and must be at least one byte in length.

Following the identity exchange, the master usually sends a command code and awaits a response from the slave, although the only response required by a given command may be an acknowledgement. The sequence of alternate frame transmission and acknowledgement may be repeated any number of times and in whatever order required by the application. There is a command code for each of the functions selectable by the key buttons 156.

While the foregoing discussion has been illustrated with reference to the master and slave being electronic key and lock box, respectively, the same system is used to communicate with the programming base. Command codes associated with the programming base include Connect To Lock box, Connect To Key, Read Key Data, Write Lock box Data, and Write Key Data.

Details of Illustrative System Transactions

To operate a lock box, the user first energizes, or wakes up, electronic key 14 by pressing the Clear Start button **156*i* on keypad 140. Transducer 150** sounds to confirm that the key is activated. The user then has a brief time period, such as one minute, within which to enter a number. Normally this number will be the user's four-digit personal code (PIN code), which must be entered prior to requesting the Obtain Key function. However, the number can also be an update code or a shackle release code. (As discussed above, the update code is used to validate the electronic key for another period past the call-in date. The shackle code is used to verify Timed Access operations and the Read Keybox operation in addition to the Release Shackle operation.)

If no such number is correctly entered within the brief time period (except for the Send Data operation, which requires no number), the key microprocessor 146 causes the key to return to sleep. If the number entered by the user corresponds appropriately to the function whose execution is next requested, the requested operation is permitted to proceed.

The foregoing steps "arm" the key. Once armed, the key is simply mated in the lock box nest 26 (if it is not already so positioned) to continue the requested operation.

The following discussion details this and other system transactions in greater detail.

As explained earlier, all transaction sequences include an initialization block exchange, of which the challenge/response test is a part. In all lock box/electronic key transactions, the lock box begins the transaction by sending the slave ID block detailed above. The key responds with the master ID block, also discussed above.

After this initial dialogue has been successfully completed, an Obtain Key transaction proceeds as follows:

The key transmits to the lock box a block of data that includes the Obtain Key op code, the data corresponding to the year, month, date and time, a first MLS code, together with an associated update code (and up to five additional MLS codes with corresponding update codes) and concludes with a check byte.

If the lock box determines that the key is properly authorized (i.e. one of the key's MLS codes corresponds to the lock box's own MLS code, and if the update code is timely), the lock box returns to the key a block of data including an op code reflecting that the Obtain Key operation has been allowed. A brief period of time then elapses during which an energy storage capacitor 135 in the lock box charges from the key battery **152*a*** until it contains sufficient energy to release the dwelling key compartment. After this compartment has been released, the lock box responds to the key with an additional transmission block that includes an op code indicating that the requested operation has been completed.

If, for some reason, the lock box determines that the transaction should not be allowed, it returns to the key a block containing an op code reflecting that the operation has been denied.

If the user requests that the lock box send the key its access log data, the transaction again begins with the initialization block exchange detailed earlier. The key then transmits to the lock box a block of data that includes an op code identifying the requested Send Data operation, the key identification code, the year, month, day and time, and a check byte.

The lock box responds with a block of header data that includes the lock box's ID, the lock box's MLS code, the lock box's owner ID, the container release counter data, the value of the head and tail pointers, and update issue code, and concluding with a check byte.

The key responds to the lock box with a short block that includes an op code instructing the lock box to proceed with the Send Data operation. The box then responds with a block of data that includes one or more entries from the access log and an op code indicating whether the entry being transmitted is the last one to be transmitted. It continues to send such blocks until the last entry from the access log is transmitted. It then sends a confirmation code to the key confirming that the operation has been completed. (Each datum from the access log includes both the accessing key's identification and the date and time of entry.)

If the user requests a Release Shackle operation, the transaction again begins with an exchange of initialization blocks, as detailed earlier. The key then sends to the key box a block that includes the Release Shackle op code, the key identification code, the year, month, day and time, a shackle code and a check byte. The key box responds with a status block confirming receipt of the instruction. A period then ensues during which power in the lock box sufficient to energize the shackle solenoid is accumulated from the key. When sufficient power has been accumulated, the shackle release solenoid energizes. The box then responds to the key with a code indicating that the operation had been completed.

As noted above, if it is desired to release the shackle completely from the lock box, the foregoing steps must be executed a second time.

Conclusion

From the foregoing, it should be apparent that the above-described system provides a number of advantageous improvements over the prior art.

Having described and illustrated the principles of our invention with reference to an illustrative embodiment, it will be recognized that the invention can be modified in arrangement and detail without departing from such principles. For example, while the invention has been illustrated with reference to a real estate lock box system, it will be recognized that many of the principles thereof are directly applicable to other electronic security applications, such as industrial site security devices.

In view of the many possible embodiments to which the principles of our invention may be put, it should be recognized that the detailed embodiment is illustrative only and should not be taken as limiting the scope of our invention. Rather, we claim as our invention all such embodiments as may come within the scope and spirit of the following claims and equivalents thereto.

We claim:

1. A method of operating an electronic real estate lockbox system, the system including an electronic lockbox, an electronic key, and a central computer, the method comprising:

placing a dwelling key in a lockable compartment inside the lockbox, the dwelling key permitting access to a property listed for sale by a listing real estate agent, the listing agent being affiliated with one of a plurality of local real estate offices, said local real estate office in turn being affiliated with a regional real estate board;

providing the lockbox with a lockbox identification code;

providing the electronic key with a key identification code;

entering a user code on a keypad associated with the key;

verifying from the user code that the user entering the code is an authorized user of the key;

relaying data between the electronic key and lockbox;

unlocking the lockbox compartment to allow access to the dwelling key contained therein in response to the data relayed between the key and lockbox;

storing transaction data specifying the date and time of the unlocking transaction, together with at least one of either the lockbox identification code or the key identification code, in a memory, said data being in raw numeric form;

transferring the transaction data from the memory to the central computer, said central computer being located remotely from the local real estate office;

providing the computer with interpretive data permitting the computer to correlate the key or lockbox identification code to a textual counterpart identifying the key or lockbox, respectively;

interpreting the transaction data with said interpretive data to produce an interpreted activity report that includes interpreted textual, rather than raw numeric, data;

establishing a telephone link between the central computer and a remote location; and transmitting by facsimile the interpreted activity report to the remote location.

2. The method of claim 1 which further includes storing data in the lockbox identifying the regional real estate board.

3. The method of claim 2 which further includes providing the computer with interpretive data permitting the computer to correlate the data identifying the regional real estate board with a textual counterpart thereto.

4. The method of claim 1 which further includes storing data in the lockbox identifying said one of a plurality of local real estate offices.

5. The method of claim 4 which further includes providing the computer with interpretive data permitting the computer to correlate the data identifying said one of a plurality of local real estate offices with a textual counterpart thereto.

6. The method of claim 1 which further includes storing data in the lockbox identifying the listing agent.

7. The method of claim 6 which further includes providing the computer with interpretive data permitting the computer to correlate the data identifying the listing agent with a textual counterpart thereto.

8. The method of claim 6 which further includes storing data in the lockbox identifying the regional real estate board and said one of a plurality of local real estate offices.

9. The method of claim 8 which further includes providing the computer with interpretive data permitting the computer to correlate the data identifying the regional real estate board and said one of a plurality of local real estate offices with textual counterparts thereto.

10. The method of claim 1 which further includes transferring the transaction data from the memory to the central computer over a telephone line by modem transmission.

11. The method of claim 10 which further includes storing the transaction data in the key and coupling the key to a transmitting modem.

12. The method of claim 10 which further includes storing the transaction data in the lockbox and coupling the lockbox to a transmitting modem.

13. The method of claim 10 which further includes storing the transaction data in the lockbox, downloading the transaction data from the lockbox to the key, and coupling the key to a transmitting modem.

14. The method of claim 13 in which the downloading step is performed in response to operation of a predetermined button on the keypad by a user of the key.

15. The method of claim 1 in which the relaying data step comprises:

transmitting data identifying the key from the key to the lockbox;

determining in the lockbox whether the key data corresponds to an authorized user;

transmitting data identifying the lockbox from the lockbox to the key;

determining in the key whether the lockbox data corresponds to a lockbox that the key is authorized to operate; and transmitting from the key to the lockbox an unlocking signal causing the lockbox compartment to unlock.

* * * * *